United States Patent [19]

White et al.

[11] 4,009,375

[45] Feb. 22, 1977

[54] MONITORING SYSTEM FOR VEHICLES

[75] Inventors: Howard S. White, Toronto; Leonard Casciato, Downsview, both of Canada

[73] Assignee: Peat, Marwick and Partners, Toronto, Canada

[22] Filed: May 5, 1975

[21] Appl. No.: 574,827

[30] Foreign Application Priority Data

May 13, 1974 Canada ............................ 199661

[52] U.S. Cl. ...................... 235/150.24; 235/150.2; 325/117; 340/22; 444/1

[51] Int. Cl.² ................... G08G 1/09; G06F 15/50

[58] Field of Search ...... 235/150.2, 150.24, 153 A; 444/1; 340/172.5, 22, 32; 325/117

[56] References Cited

UNITED STATES PATENTS

| | | | |
|---|---|---|---|
| 3,821,715 | 6/1974 | Hoff et al. | 340/172.5 |
| 3,866,171 | 2/1975 | Loshbough | 235/153 A |
| 3,899,671 | 8/1975 | Stover | 235/150.2 |

OTHER PUBLICATIONS

Intel MCS-4 Micro Computer Set. published by Intel Corp., Jan. 1972, 12 pages.

Rosen et al.: An Electronic Route-Guidance System for Highway Vehicles, IEEE Transactions on Vehicular Technology, vol. VT-19, No. 1, Feb. 1970, pp. 143-152.

Transit Control System: Datamation, Sept. 15, 1970, pp. 94, 95.

Fenton: Automatic Vehicle Guidance and Control-A State of the Art Survey, IEEE Transactions on Vehicular Technology, vol. VT-19, No. 1, Feb. 1970, pp. 153-161.

*Primary Examiner*—Felix D. Gruber
*Attorney, Agent, or Firm*—Nolte and Nolte

[57] ABSTRACT

A vehicle monitoring system is disclosed in which a central control station is provided for the vehicles, for example buses, in the system. Each vehicle is provided with a transit universal microprocessor unit, including a modulator-demodulator, and one or more peripheral devices and a radio communication link is provided between the vehicles and the central control station. Typical peripheral devices are odometers, passenger counters, drive switches and display devices, loudspeakers, etc.

9 Claims, 28 Drawing Figures

MONITORING SYSTEM FOR VEHICLES

BACKGROUND OF THE INVENTION

This invention relates to a system for identifying objects during movement and idicating and/or recording the movements. The invention is particularly concerned with the identification of moving vehicles on a road and is especially adaptable for use in a bus monitoring and control system.

Passengers carried by metropolitan transit companies are normally carried on commercial buses operating over established routes at pre-established schedules. It is known that in order to efficiently utilize the bus equipment and to provide the best service to users of the bus system, it is desirable to maintain the operating schedules of the bus as close as possible with the schedules which have been established for each of the buses in the system. Up to a short time ago, it was usual for most bus systems to rely upon the individual bus operators to maintain their schedule and to avoid disastrous traffic situations and the like. As streets become more crowded, and more people use bus transportation to meet their transit requirements, it becomes manditory to develop a transit control system which accurately controls the schedules of all the buses in the system.

In many cities at the present time, many transit companies place supervisors on street corners for controlling the operations of the buses on routes passing the street corners to which the supervisors are assigned. Communication procedures and devices have been developed in order to assist those supervisors in communicating with dispatchers in order to control and maintain the scheduled operations of the buses in the system. Such a technique, however, is relatively inefficient and requires a large number of supervisors in order to provide the dispatchers with an accurate picture of the operations on each of the different runs or routes of the buses in the system.

To accurately control the scheduling of buses, it is necessary for the dispatchers to know when two buses are running too close to one another, due to either behind-schedule or ahead of schedule buses, thereby providing unbalanced and inefficient utilization of the equipment and disrupting schedules. It is also desirable to know, as soon as possible, when a bus develops mechanical trouble, so that a decision can be made to keep the bus in service, send it to a garage, or stop operation and to provide supplementary equipment to substitute for the disabled bus if necessary. In many situations, the dispatching of emergency equipment to the bus in a short time will enable the placement of the bus back into service without significantly disrupting the service on the route of which the bus is a part.

Since street obstructions either of a semipermanent nature or of a temporary nature, such as accidents, frequently occur on metropolitan transit system routes, it is desirable to be able to alter the buses on the route which is obstructed by such an obstruction, so that immediate action can be taken to direct the buses to alternate street routes if necessary. Finally, in most metropolitan transit operations, increasing problems with safety on the buses are occurring. Robberies, vandalism, and disorderly conduct not only jeopardize the operator but can deter riders from using the transit system. As a consequence, it is desirable to provide the bus operator with a means for summoning help on an emergency basis in an unobtrusive manner.

Electronic systems have previously been used in controller bus monitoring systems in which the location of vehicles following a pre-established route is provided automatically in response to interrogation of the vehicle from a control center.

SUMMARY OF THE INVENTION

It is an object of the present invention to provide a system for identifying particular objects during movement and indicating or recording their movement which is an improvement over the said previous systems and is more economic to manufacture, particularly when used in a vehicle monitoring system.

Accordingly, the present invention provides a system for monitoring objects during movement along a path of travel including a transit universal micro processor unit located on the object and incorporating modulator-demodulator means in the system for high speed transmission encoding and decoding.

The diagrams illustrate a system for use with a bus system in a metropolitan environment and it will be observed that the system utilizes, in the buses, a silicon gate MOS 8080 manufactured by Intel Corporation of California U.S.A., which is a single chip eight-bit parallel central processor unit. More than one is, of course, used in the system. The unit is sometimes referred to as a microprocessor unit.

The following general description should be read in conjunction with the Figures and it is believed that a clear appreciation of an embodiment of the present invention will thereby be derived to permit construction of a system suitable for a bus monitoring system.

DESCRIPTION OF THE PREFERRED EMBODIMENTS

Figure 1:
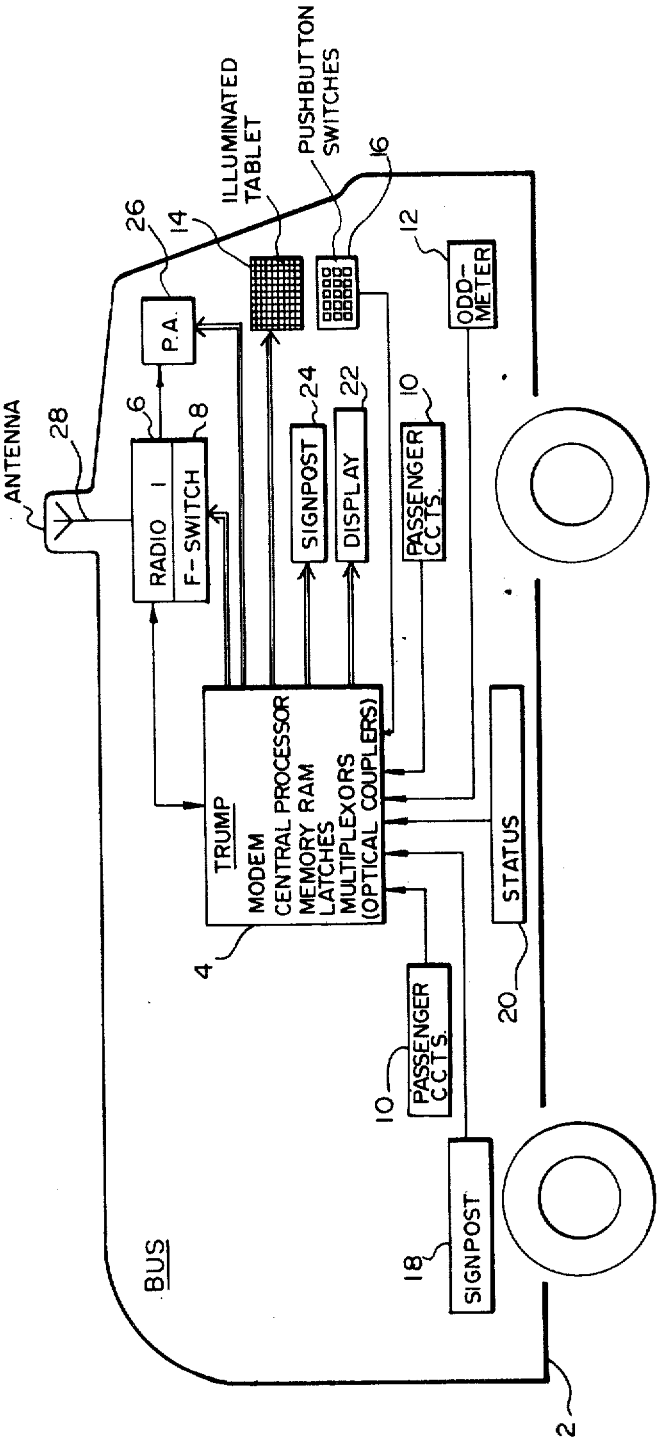
FIG. 1 is a diagrammatic representation of a bus with the apparatus contained therein indicated in block form.

Referring to FIG. 1, it will be seen that the bus is diagrammatically illustrated at 2 and the apparatus used in the bus is illustrated by block diagram formation. It wll be understood that, in fact, the apparatus will normally be constructed in one or two electronic units located in a convenient position on the bus. Each bus or street car in the system will have the same, or a similar, installation.

Referring to FIG. 1, the system includes a transit universal microprocessor unit 4 (which we refer to by the trade name TRUMP) and this unit includes a modulator-demodulator circuit for high speed transmission including encoding and decoding facilities. It also includes a central processing unit, a memory unit including random access memory facilities as well as read-only memory and programmable read-only memory facilities, latches to store outputs, multiplex facilities to fan out outputs among several output devices, concentrator facilities to concentrate inputs into a few input lines as well as optical isolators to isolate the various devices electrically from the noisy bus environment.

Each bus may be provided with a number of additional units and, by way of example, a radio communication unit 6 is shown in FIG. 1 consisting of a transmitter and a receiver. The radio 6 may incorporate a device 8 permitting the frequency to be changed under external control and the radio will normally be provided with a microphone permitting the driver to speak to a central control station. Furthermore, it would normally be provided with a public address system to permit the passengers on the vehicle to be addressed or to permit specific information to be directed to the respective driver of the bus.

Additional peripheral devices are provided on the illustrated bus 2 and include a passenger counter unit 10 to count passengers entering and leaving the vehicle, an odometer counter 12 to measure the distance travelled by the bus, load devices (not shown) within the vehicle to count passengers by weighing the vehicle, illuminated tablet units 14 to display instructions from the central control station (not shown), and push button switch units 16 which the driver can utilize to send messages to the central control station. Additional special devices include a sign post detector receiver 18 to identify road side sign posts that may be passed by the bus, status switches 20 which are automatically set by the vehicle so as to indicate, for example, the opening of doors, the vehicle temperature, and the vehicle oil pressure. Another series of status switches may indicate to the TRUMP unit 4 the status of the transmitter and receiver in the radio unit 6, i.e., whether the message is being received or being transmitted. Additional units include an illuminated display unit 22 for indicating the name of the next bus stop to passengers and/or a small transmitter 24 to transmit such information to road side sign posts along the route. These road side sign posts would carry display information such as the time of the next bus or the bus loading so as to indicate to waiting passengers when the next bus would be coming. The passenger loud-speaker or P.A. System is indicated in FIG. 1 by the numeral 26 whilst the antenna associated with the radio, transmitter-receiver, 6 is identified by the numeral 28.

Figure 2:
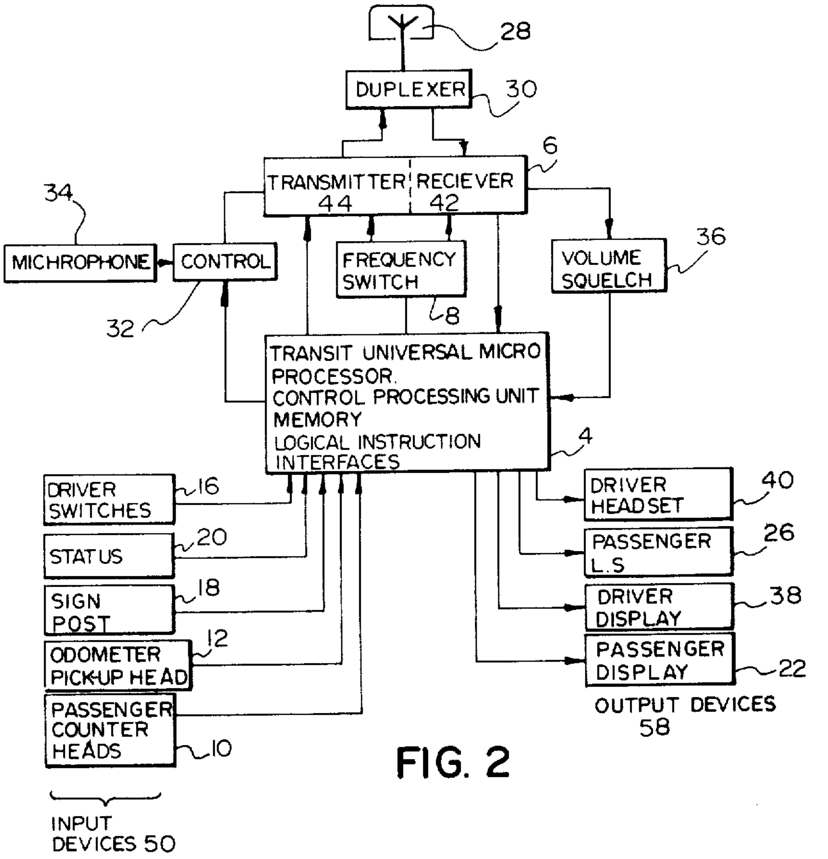
FIG. 2 illustrates the apparatus within the bus in a slightly different format.

Referring to FIG. 2, it will be seen that the system of FIG. 1 is re-drawn in a slightly different arrangement and including certain additional devices which are incorporated in this embodiment. It will be observed that a duplexer unit 30 is provided at the output of the transmitter and the input of the receiver of radio unit 6 whereby the obvious advantages thereof are obtained to permit multiple channels to be used simultaneously. Control unit 32 is indicated between the transit universal microprocessor unit 4 (TRUMP) and the transmitter of unit 6 whilst a microphone 34 is associated therewith. A volume/squelch unit 36 is indicated between the receiver of radio 6 and the TRUMP unit 4.

The same reference numeral has been applied to like parts in FIG. 2 as were used in FIG. 1, and for convenience, the driver display unit 38 is also indentified whilst the driver head set unit 40 is also indicated. The units 10, 12, 16, 18 and 20 may be considered as input devices whilst the units 22, 26, 38 and 40 may be considered as output devices.

Figure 3:
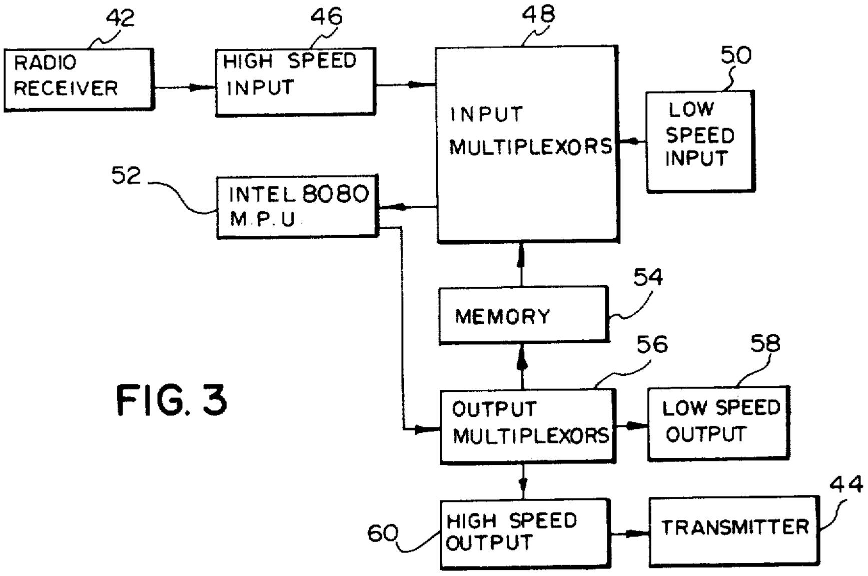
FIG. 3 is a block schematic representation of a part of the system on a bus in a transit system.

In FIG. 3, a part of the bus transit system of FIGS. 1 and 2 is diagrammatically illustrated with particular consideration to the logic operation of the system. As mentioned above, the radio unit 6 includes a radio receiver and a radio transmitter and those units are separately identified in FIG. 3. The radio receiver is identified by the numeral 42 whilst the radio transmitter is identified by the numeral 44. When the radio receiver 42 receives information it is passed through a high speed input unit 46 to the input multiplexer unit 48, forming part of the above-mentioned muliplexer unit 30, to which are also fed the low speed input signals from the low speed input units 50 for example, the passenger counter and odometer information as mentioned above.

The input multiplexers 48 pass the information to the Intel 8080 M.P.U. unit 52. The memory unit associated with the system is identified by the numeral 54 and provides the input multiplexers 48 for utilization by the system in the normal manner.

The output from the Intel 8080 unit 52 is fed to the output multiplexer unit 56 which also receives information from the respective low speed units identified by the low speed output unit 58 in FIG. 3. Unit 56 provides an output to the memory unit 54 for operation purposes and also provides a main output through to the high speed output unit 60 and thus to the transmitter unit 44 for transmission of information to the central control station (not shown).

Figure 4:
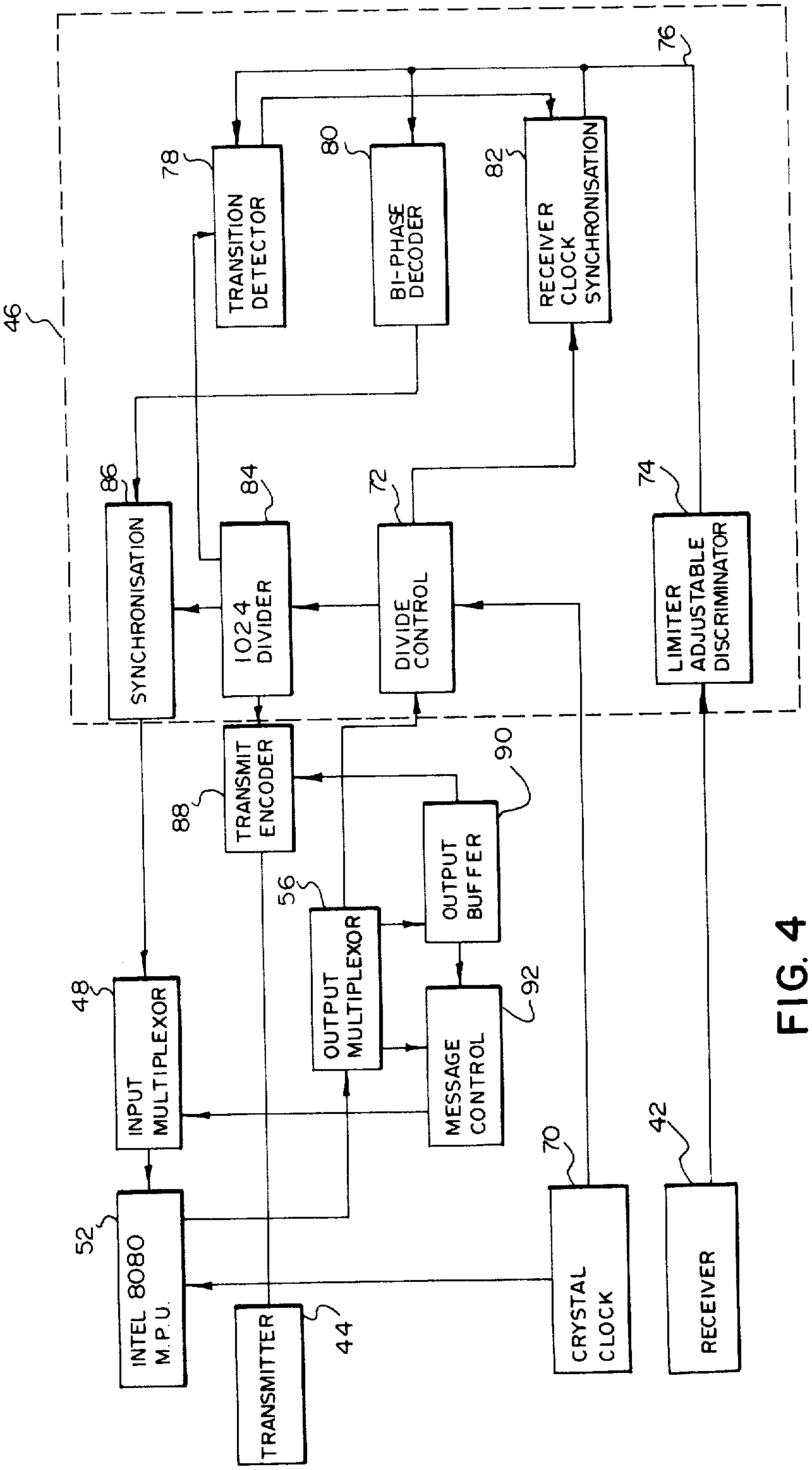
FIG. 4 is a more detailed block schematic corresponding to FIG. 3 particularly of the high speed input unit with other associated units.

Referring now to FIG. 4, it will be seen that this includes a block schematic representation of a part of the high speed input unit 46 of FIG. 3 but in greater detail. For convenience of description, some of the early units of FIG. 3 will be seen to be reproduced in FIG. 4 and are identified by like numbers. The units which can be regarded as within the input unit 46 are enclosed with a broken line indicated in FIG. 4.

One basic unit which is indicated in FIG. 4 and which is common to a number of other units is the crystal clock unit 70 which provides control clock pulses to the rest of the units, a control line being shown, by way of example, to the Intel unit 52 and a divide-control unit 72 which is associated with the system during receiving and transmission. It will be seen that the output of receiver 42 passes through a limiter adjustable discriminator unit 74, forming part of unit 46, and the output of the discrimiaator unit 74 is fed along connection 76 to the inputs of a transition detector unit 78, a bi-phase decoder unit 80 and a receiver clock synchronization unit 82. Interconnection between these units is provided as illustrated in FIG. 4. The receiver clock synchronization unit 82 receives an input from the divider control unit 72 whilst the transition detector unit 78 receives an input from a divider unit 84. This may be a type 1024 divider. The divider unit 84 receives an input from the divide control unit 72 and provides an output to the transition detector unit 78 as well as to a synchronization unit 86 and a transmit-encode unit 88. It will be observed that the output multiplexer 56 provides an output through an output buffer unit 90 to the transmit encode unit 88 as well as to a message control unit 92 which also receives an output direct from the output multiplexer 56. The message control unit provides output control signals to the input multiplexer 48 which also receives an input from the synchronization unit 86 and provides an output the Intel 8080 M.P.U. unit 52. The output of the latter unit is connected to an input of the output multiplexer unit 56.

From the above it will be seen that the units associated with the receiving operation may be considered as 42, 74, 78, 80, 82, 72, 84, 86 and 48, whilst the units associated with transmission particularly may be considered as the units 72, 88, 90, 92, 56, and 44, and clock pulse unit 70 being common to both types of operation.

Figure 5A:
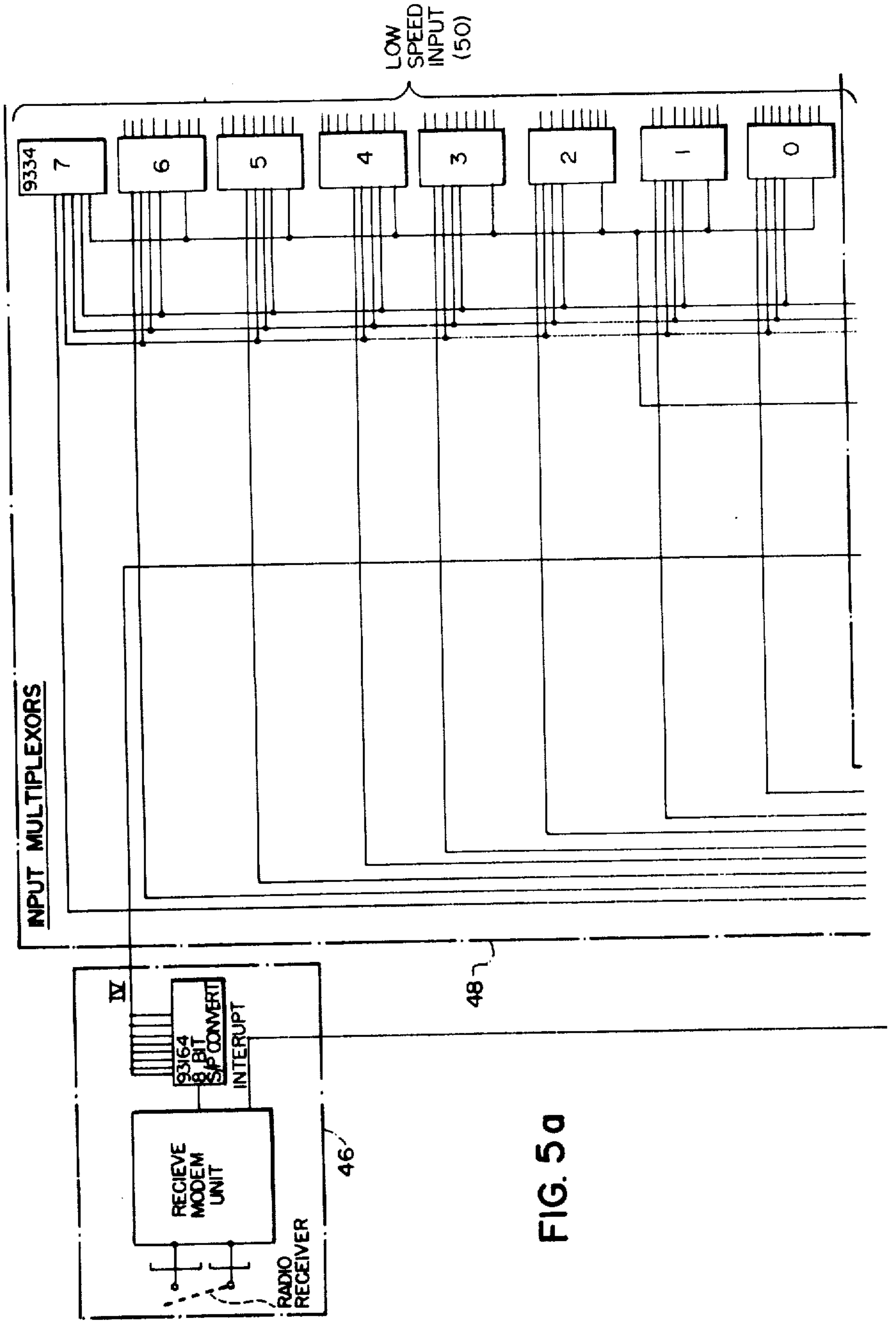
FIG. 5 comprises FIGS. 5*a*, 5*b*, and 5*c*, arranged as in FIG. 6 and is a more detailed functional representation of a part of the system shown in FIG. 3 including the input/output multiplexors.
Figure 5B:
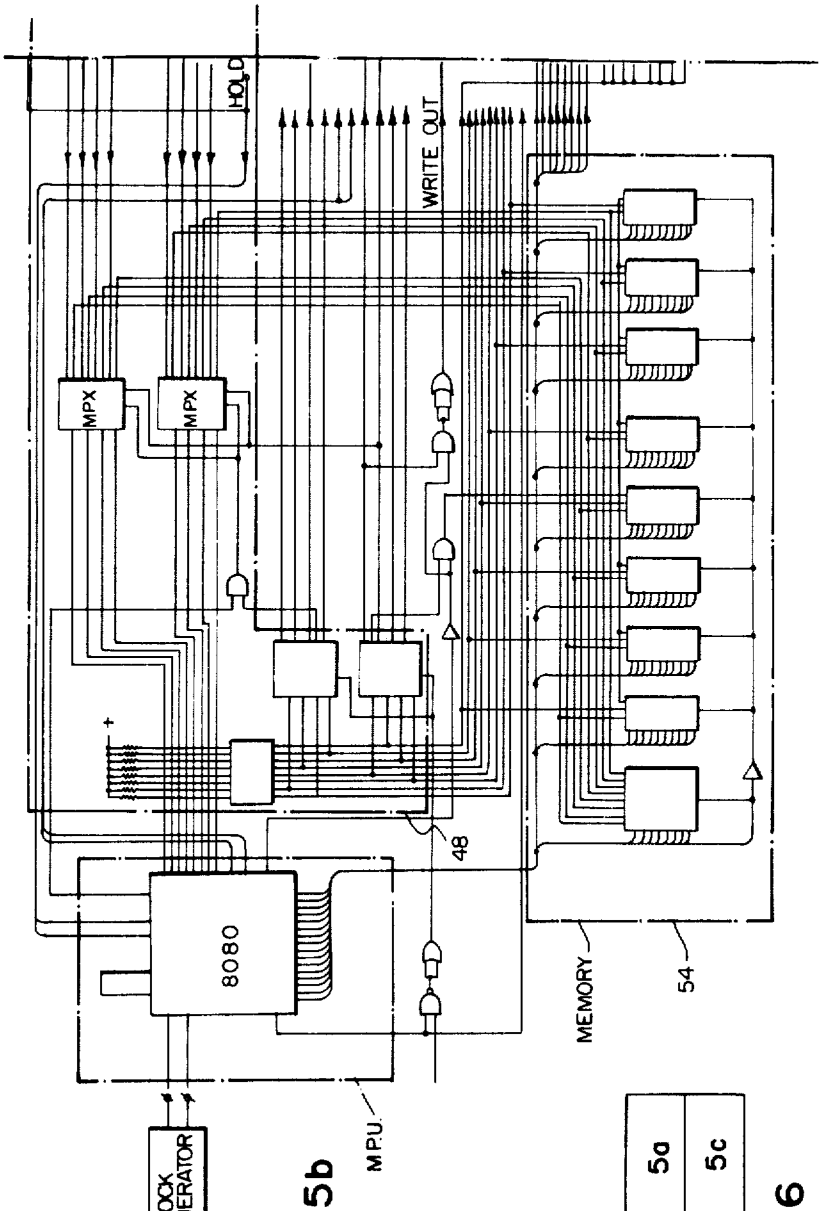
Figure 6:
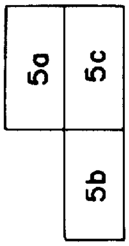
FIG. 6 shows the relative positioning of FIGS. 5*a*, 5*b*, and 5*c*, to form FIG. 5.
Figure 5C:
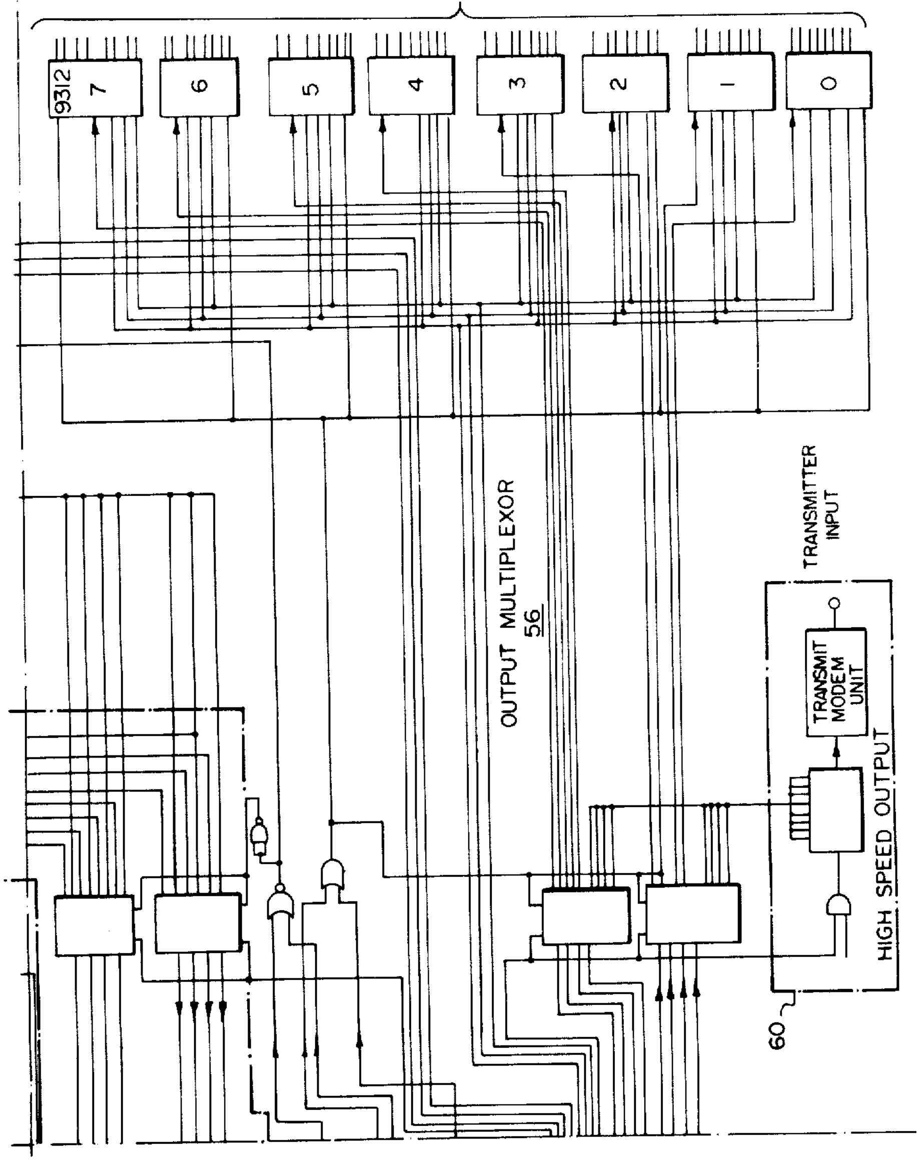

In FIG. 5, the system as illustrated in FIG. 3 is redrawn so as to include more detail of the specific units identified in FIG. 3. For convenience, the same reference numerals have been applied to like units in FIG. 5 as were used in FIG. 3. The detail diagram is believed to be clear from a consideration of FIG. 7 and the above description of FIG. 3 having regard to the logical symbols employed.

In a similar manner, FIG. 7 is a more detailed description of the system shown in FIG. 4, like numbers being applied to the same units in FIGS. 7 and 4. Again, the logical arrangement indicated is believed to be self-evident without further description.

It will be understood that the detailed diagrams of FIGS. 5 and 7 are indicated by way of example only and, a full understanding of this embodiment of this invention can readily be deduced from the block schematic diagrams of FIGS. 1 through 4. However, for further understanding of the illustrated embodiment, additional information will be given below as to the operation of some of the units illustrated in FIG. 7.

As will have been appreciated from the above description and the related drawings, interchangeable input/output peripheral devices may be connected in the system.

The first type of input/output device envisaged is the use of one or more MODEM units. The MODEM unit (modulator-demodulator) which will be described below in greater detail is designed to allow simple interfacing with any voice radio systems. The input to the MODEM from the voice radio is the audio signal and the output from the MODEM unit to the voice radio is also an audio signal. It is a relatively simple task to interface and match the voltage levels so that they are compatible with any voice radio.

The other type of input/output devices which are utilized in the illustrated system may be regarded as low-speed devices. This term covers a wide range of devices, as will be appreciated, and includes as input devices to the transit universal microprocessor unit 4 of FIG. 2, the odometer counters, the passenger counters, the road side signposts and the driver actuated switches. The output units on the processor 4 include the driver display lights, the low speed mobile printer, the driver loudspeaker, the passenger display signs, the frequency switches, and the control for the radio unit 6.

The above-mentioned input and output low speed devices are constructed in a simple manner and this philosophy permits all the devices to be interfaced. In one constructed embodiment each of the devices was constructed as a simple switch closure and in FIG. 9, by way of example, a construction on an odometer counter is diagrammatically illustrated.

Figure 9:
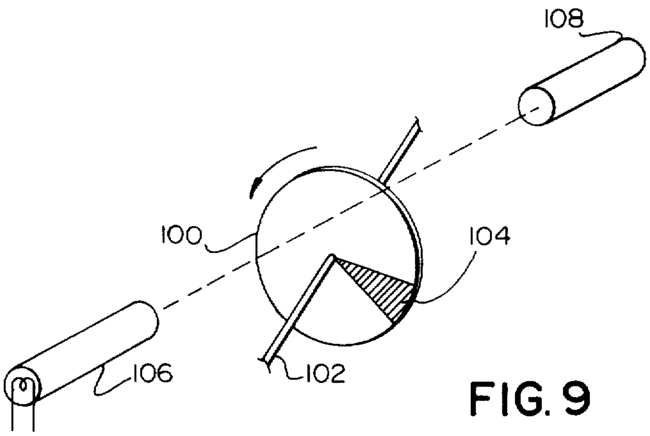
FIG. 9 is a diagrammatic representation of an optical detector device for use in a system according to the present invention.

In FIG. 9, the odometer counter is an optical odometer counter and comprises an opaque disc 100 which is mounted on the vehicle's odometer cable 102 and thus it rotates as the vehicle moves. The disc 100 is provided with a transparent section 104, which may conveniently be an aperture, and is located between an Infra-Red laser unit 106 and a laser detector unit 108. Thus, as the vehicle moves, the cable 102 is rotated so as to cause the disc 100 to rotate whereby for each revolution of the disc the detector 108 receives one light pulse from the laser unit 106. The detector unit 108 is a photo-transistor and each rotation of the disc 100 results in a flow of current so that the operation is equivalent to a switch closing. The flow of current was arranged to activate an optical isolator (MOC 610) which was connected to the respective input of TRUMP unit 4 of FIG. 2. Thus, as a result of the current flow, a binary 1 condition is established at the respective TRUMP input terminal.

The odometer counter was designed to produce 1000 pulses per minute at 60 m.p.h. whereby the time between each current pulse from the detector 108 was about 60 ms. Since the Intel unit 52 of FIG. 3 has a cycle time of 2 $\mu$s, then the time of 125 ms. is many times what is needed to complete a particular counting operation.

As will be appreciated, the microprocessor unit 4 examines the input line from the odometer counter and if a 0 condition is followed by a 1 condition, then this is recognized as constituting a count of one revolution. Since the logic arrangement for the odometer counter is in the form of a stored program in the microprocessor unit 4, it will be appreciated that costly hard-wired logic devices are not required so that a substantial advantage can be achieved in both cost and convenience.

Figure 10:
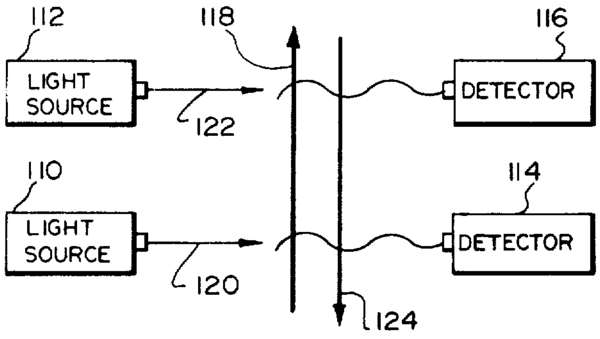
FIG. 10 is a diagrammatic representation of two optical detector systems used as a counter of passengers on a bus.
Figure 11:
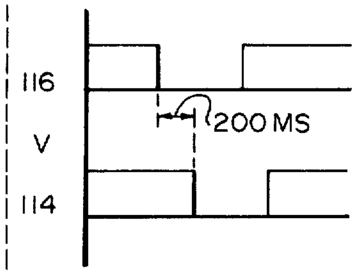
FIG. 11 is a graphical representation of the voltage waveforms obtained from the devices illustrated in FIG. 10.

In FIG. 10, a possible passenger counter is illustrated diagrammatically together with the waveforms which would be produced in one direction of operation.

Two light sources 110, and 112, with respective detector units 114 and 116, are spaced apart at the entrance (exit) to the bus. On getting on the bus, a passenger travels in the direction of arrow 118 and first interrupts the light beam 120 and then interrupts the light beam 122. Similarly, a passenger getting off the bus, travels in the direction of arrow 124 and interrupts the light beams in reverse, i.e., firstly interrupting the light beam 122 and subsequently interrupting the light beam 120.

The order of interception of light beams gives the direction in which the passenger is moving and, by way of example, the sequence of waveform voltages due to a passenger getting off the vehicle are indicated on the right of FIG. 10. It is arranged that an un-interrupted light beam results in a logical 1 indication whilst an interrupted beam results in a 0 indication. The spacing of the two systems is such that the fastest this can happen is in the order of 250 – 500 ms. and in FIG. 10 the delay of 200 ms. between the response from passenger detector 116 and passenger detector 114 is indicated. The microprocessor time is of the order of 2 $\mu$s, and thus the microprocessor unit examines the lines from the passenger counter for the respective conditions. Since the passenger counter consists of photodetector units only, which are effectively simple switch closures the MPU performs the remainder of the logical operations necessary to identify passenger movement without any difficulty. The logical instructions can be in the form of a stored program in a read-only memory. It will be appreciated that the advantage of the stored program is that it is much simpler to construct, easier to test, and requires no hard wired logic. Furthermore, it can easily be modified and changed.

One advantage of the system described above is that it would appear to be possible to connect any peripheral type of device to the TRUMP provided that they can be emulated by switch closures. Some of the devices will, of course, contain only switch closure units and thus could be much simpler and less expensive than other devices which are provided with their own logic in prior systems. All the logic units necessary could be provided by stored programs in the MPU.

In the above description, we have considered the simple switch closures providing universal application of the input/output operation. We will now consider additional illustrated elements in the following order:

a. The MODEM unit having the facility of universal attachment possibilities so as to fit any type of radio system. This falls within the unit 4 of FIG. 1.

b. The microprocessor unit which is used to control the operation of the system. This is identified in FIG. 4 by the numeral 52.

c. A self-checking feedback feature which may be provided.

d. The logical operation of the data multiplexing units will be described so as to facilitate a further understanding of the attachment of a multitude of simple peripheral data collection and data transmission units in the system.

e. The capability of the system for remote change of the stored program will be considered.

f. The MODEM (modulator-demodulator) unit.

A typical modulator-demodulator may be, for example, of the type known as a bi-phase transition modulator. The modulation rate chosen was 1,200 bauds. It will be appreciated that bi-phase transition modulation means that a 0 bit is described by repeating the same phase whilst a 1 bit is described by a 180 degree phase shift for each shift.

Figure 7A:
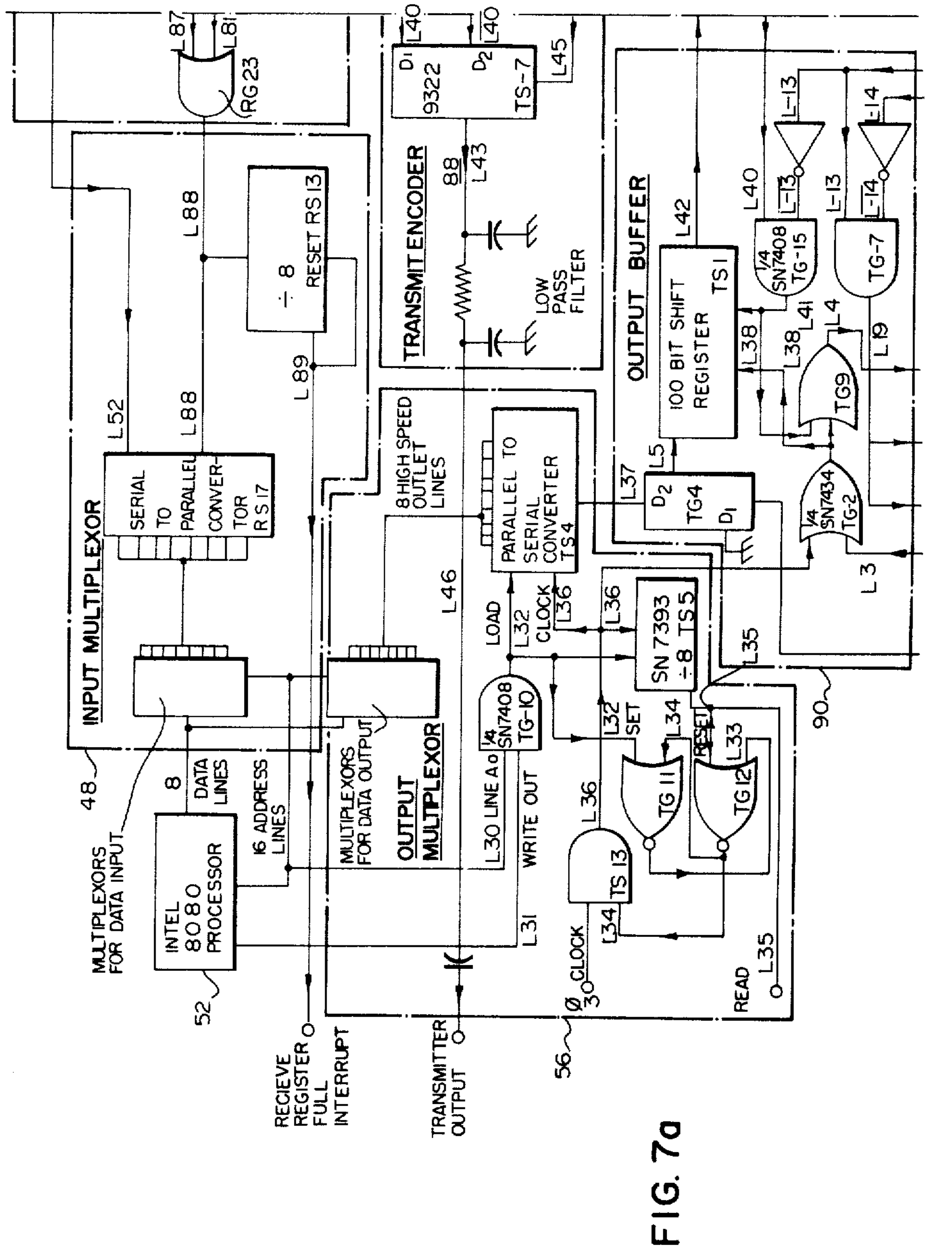
FIG. 7 is an even more detailed logic diagram corresponding to FIG. 4 and comprises FIGS. 7*a*, 7*b*, 7*c*, and 7*d*, arranged as in FIG. 8.
Figure 7B:
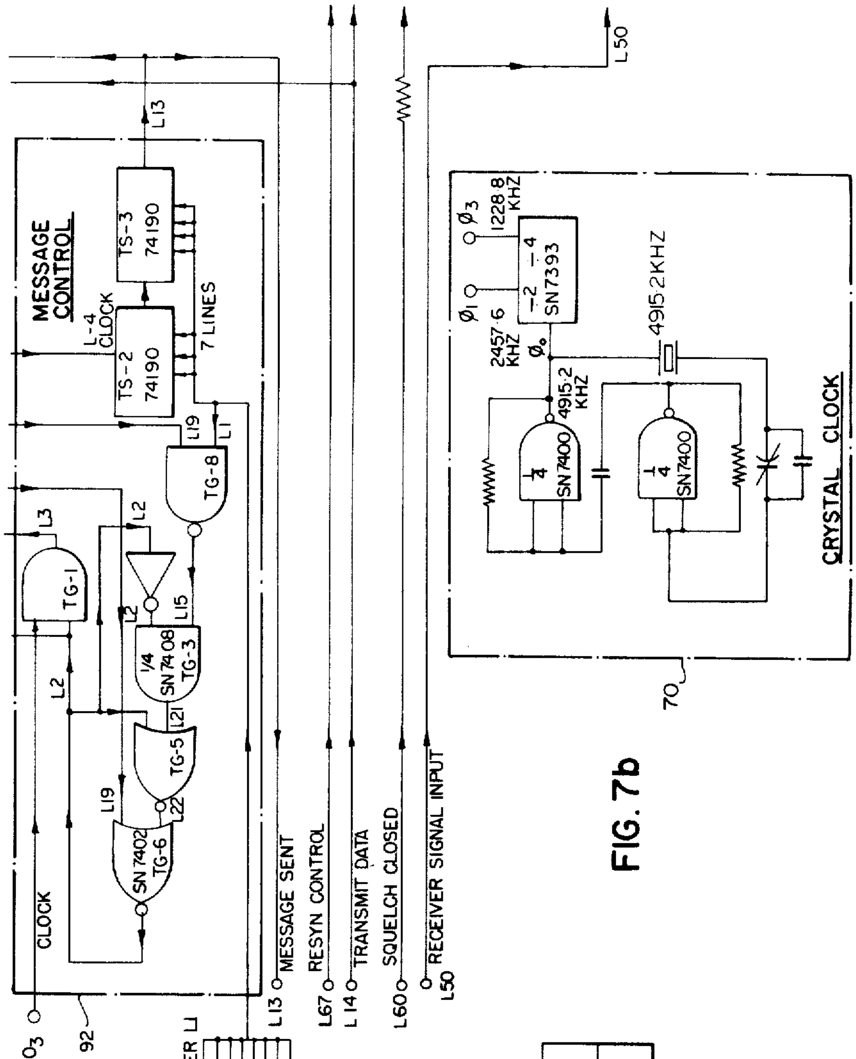
Figure 8:
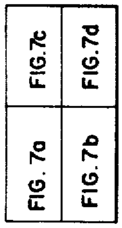
FIG. 8 shows the relative positioning of FIGS. 7*a*, 7*b*, 7*c*, and 7*d*, to form FIG. 7.

The basic signals and timing signals are generated from a crystal clock unit identified by the numeral 70 in FIG. 4 and in FIG. 7*b*. The clock unit is described in greater detail in the publication "Electronics Designers' Case Book" by McGraw Hill (1973) at page 28.

Figure 7C:
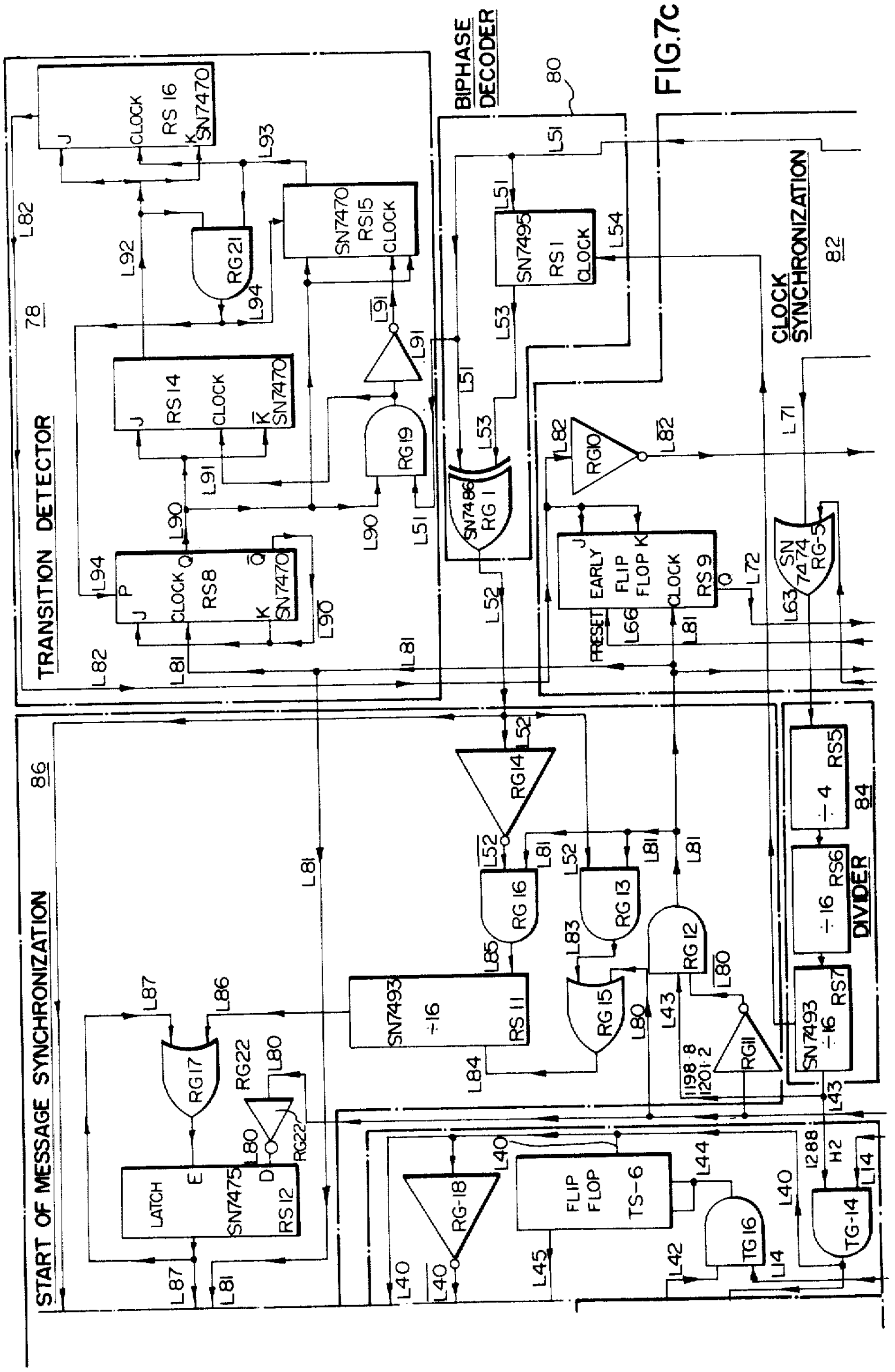

With reference to FIG. 7*c* it will be seen that the signals at 1200 Hz are obtained from the crystal clock unit 70 (FIG. 7*b*) by means of suitable divider units. The 1200 Hz signals are used to transmit data and since the same clock unit is used for encoding and decoding, suitable complex circuitry was designed. The transmit data is relayed by the processor 52 (FIG. 7*a*) to the encoder unit 88 by way of the multiplexors and the parallel-to-serial converter and output buffer unit (FIG. 7*a*).

In the 8080 processor (MPU) 52 of FIG. 7*a*, positive logic is used and an addressing condition has to be set up on the output multiplexors 56 such that data logic levels can be transferred from the 8080 processor 52 to the eight lines leading to the parallel-to-serial converter unit.

The functional logic for transmitting a data message is as follows:

The 8080 processor (MPU) addressing and data flow are described in the document 8080 Preliminary Specification Rev. 2; July, 1973, Intel. It is sufficient for this section to assume that positive logic is being used.

An addressing condition has been set up on the output multiplexors such that data logic levels can be transferred from the 8080 processor to the 8 lines leading to the 93165 parallel to serial converter.

The functional logic for transmitting a data message is as follows:

a. A message is sent to zero the registers for transmitting b. The registers are zeroed by sending high speed $\phi_1$ clock pulses and zero logic levels until cleared c. When the register has been cleared, the register clear line is enabled.

d. The MPU sends the data message to the parallel to serial converter which is of type 93165.

e. This data is clocked out to the data register unitl all 8 bits are sent.

(f) A ready line is enabled (g) Another 8 bit is transmitted as in logic steps (d), (e) and (f) above.

(h) When the message is compared, a transmit data line is enabled.

(i) The data is clocked out of the register at 1200 baud until the full message is sent — this is known since the length of the message is present on 7 binary data lines (j) On completion of message, message sent line is enabled - this completes the transmission cycle.

Similarly on reception, the reception cycle is as follows:

(a) The reception is assumed to be "pseudo syncrhonous" this means that we can re-establish the cycle clock from the data message itself.

(b) Three factors must be achieved:

i. Clock synchronization ii. Logic level detection iii. Beginning of message synchronization (c) The reception of a message may be interrupted by three factors:

i. transmission on half duplex or simplex channel ii. loss of signal - squelch turns on iii. loss of synchronization detected by computer.

d. If message reception is interrupted the receiver is set on a "beginning of message synchronization" cycle, e. The data message has been so structured so that each begins with 2–8 bit words/16 bits of zeros. A counter detector looks for these and begins the synchronous transfer of data when this happens.

f. A movable threshhold limiter discriminator cleans up the received signal.

g. Signal transitions are phase compared with a 1198.9 Hz or 1201.2 Hz clock to synchronize the clock.

h. Logic is detected in an exclusive OR arrangement in the biphase decoder unit 80 (FIG. 7*c*).

i. Following logic steps *e*, *g* and *h* the signal is loaded into the serial to parallel converter of the input-multiplexor unit 48 of FIG. 7*a*.

j. when 8 bits are loaded an interrupt is enabled which causes the MPU - 52 (FIG. 7*a*) to transfer the data. Since 1 bit of data takes 833 $\mu s$, and the 8 bit transfer should be effected under 4ms, there should be no data conflicts.

Figure 12:
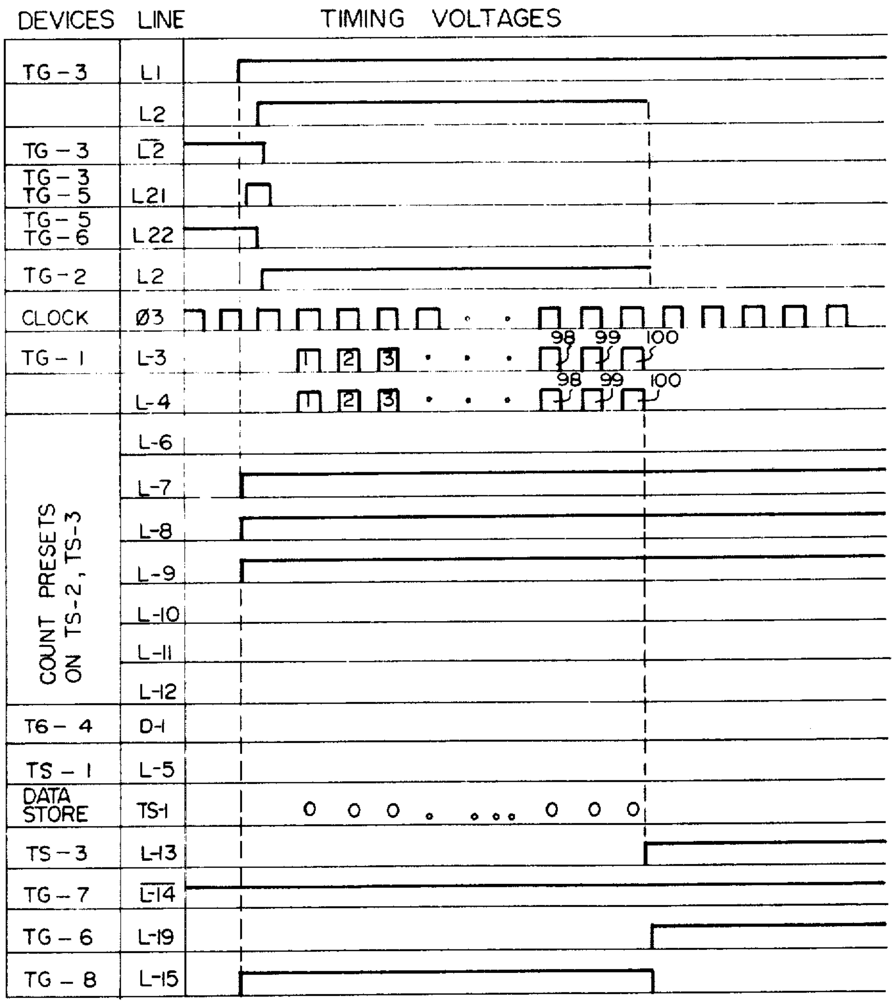
FIG. 12 is a timing diagram illustrating the entry of 100 zero bits into the zero register TS-1.

We will now consider certain timing diagrams in order to describe the action, by way of example, of certain units shown in FIG. 7. Referring first of all to FIG. 12, that is a timing diagram for the 100 bit shift register TS-1 within unit 90 for the situation where 100 0 bits are entered into the register TS-1. The register TS-1 is within the output buffer unit 90 (FIG. 7*a*) and the timing chart has been identified with reference to the logic representations in the output buffer unit 90 (7*a*) and the message control unit 92 (FIG. 7*b*) whereby the particular logical devices are identified to the left of FIG. 12 together with the respective lines and the corresponding timing voltages appearing thereon. The logical devices and the lines have been identified by the suitable code identification in FIGS. 7*a* and 7*b*. The operation will be clear from the timing chart which describes the entry of the 100 0 bits into the register TS-1. It will be appreciated that L-1 is the enabling command line; L-6 to L-12 are the preset terminals for the counting circuits for counting the 100 bits. When 100 bits have been entered, L-13 is enabled and the clock unit is disabled.

Figure 13:
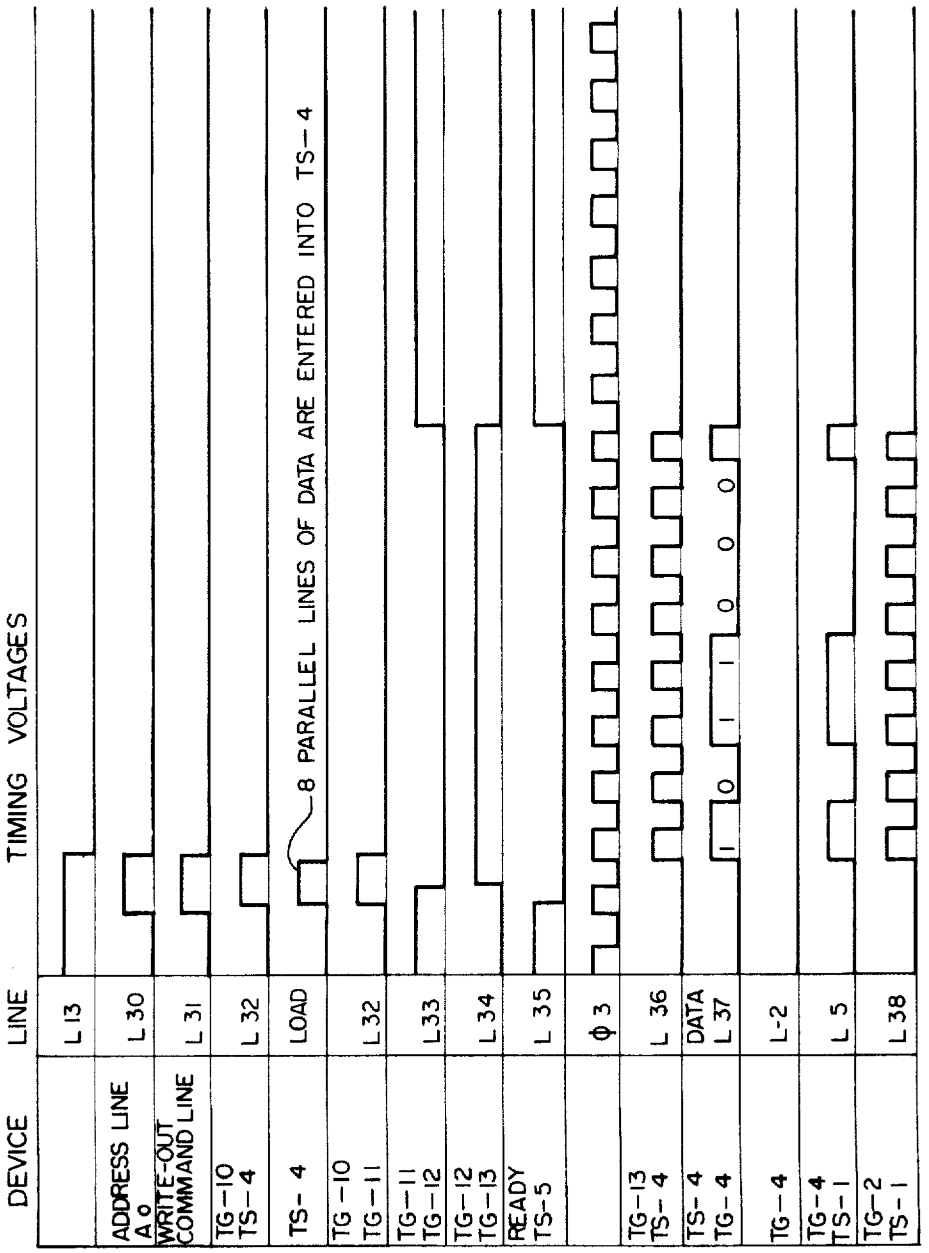
FIG. 13 is a timing diagram showing the entry of 8 data bits into register TS-1.

In FIG. 13, the timing diagram is shown for the situation when 8 data bits are entered into the register TS-1 in the output buffer (FIG. 7*a*). After the register TS-1 has been zeroed as indicated by the line L-13, the microprocessing unit 52 addresses the eight high speed output lines. Lines L-30 and L-31 are enabled so as to load the eight parallel data bits into the parallel to serial converter device TS-4. This enables line L-32 and sets the gates TG11 and TG12 and also enables, on line L-34, the gate TG13 so as to send the clock pulses $\phi_3$ on line L-36. This causes the parallel to serial converter TS-4 to be emptied through TG4 into the data register TS-1. When eight bits have been clocked out, then line L-35 and TS-5 goes high. This resets the device TG11 and device TG12 as well as disabling the gate TG13 so as to stop the clock pulses. It is then indicated on line L-35 to the microprocessor unit 52 that the system is ready for more data and the process is repeated until the required message has been composed.

Figure 14:
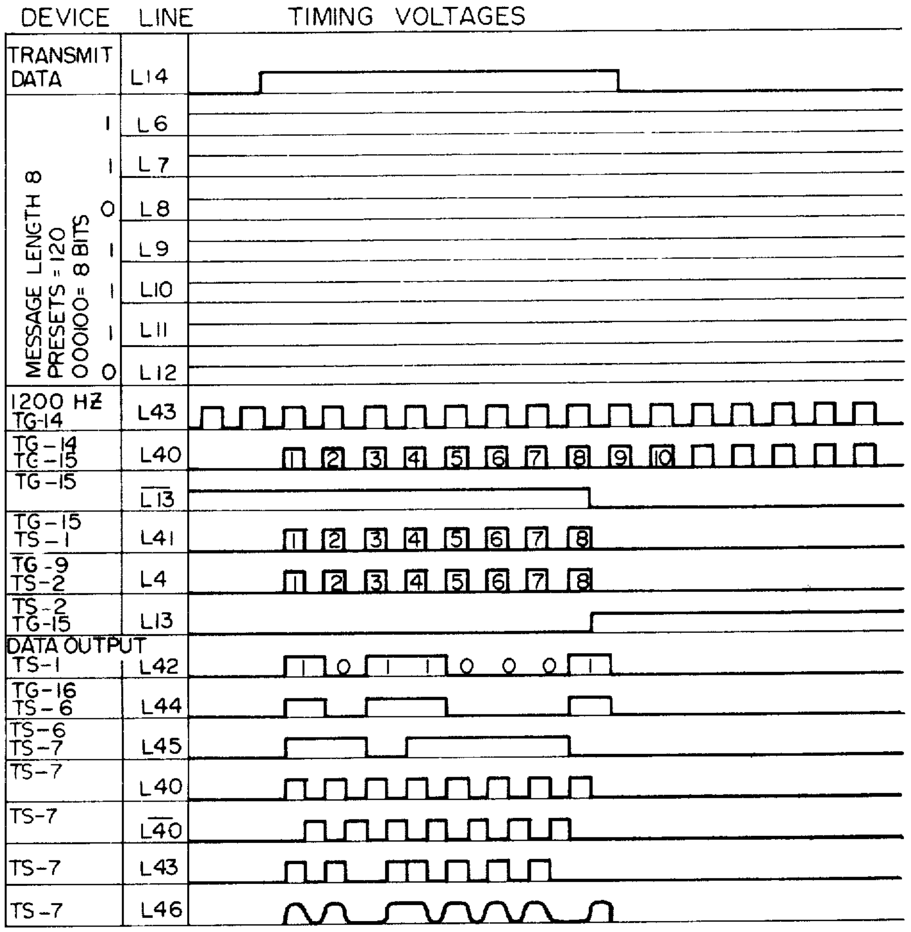
FIG. 14 is a timing diagram for the transmit-encoder unit.

In FIG. 14, the timing sequence is illustrated for the transmission of eight bits of data through the transmit encoder 88. This will be described with reference to FIG. 7*a*, 7*b*, and 7*c*.

The timing diagram in FIG. 14 shows the transmission of 8 bits of data by means of biphase modulation. A 1200 Hz clock signal is established on line L-43. The transmit command signal on line L-14 together with the message length presents lines L-6 to L-12 or (0111011 = 120) initiate the process. Voltage on Line L-14 enables gate TG14 to allow the 1200 Hz signal to pass the line L-40. Lines L-40 and $\overline{\text{L-13}}$ enable gate TG-13 to produce a voltage on Line L-41. Line L-41 clocks the output clock of the data register TS-1. Line L-41 also clocks the gate TG-9 to produce a signal on line L-4 which clocks the counter devices TS-2 and TS-3. Data logic levels are clocked out of device TS-1 on line L-42. Lines L-42 and L-14 produce signals on line L-44 through TG-16. Line L-44 operates on J and K inputs of device TS-6 such that only when line L-44 is high then L-40 will charge L-45. Line L-45 is the enabling line on device TS-7 such that when line L-45 is high then line L-40 is passed and low on line L-40 is passed to line L-43. Signals on Line L-43 pass through a low pass filter to produce signals on line L-46. When the message is sent, line L-13 goes high to stop the clocking of the message. Line L-13 informs the MPU which is turn disables (low) on line L-14.

Figure 7D:
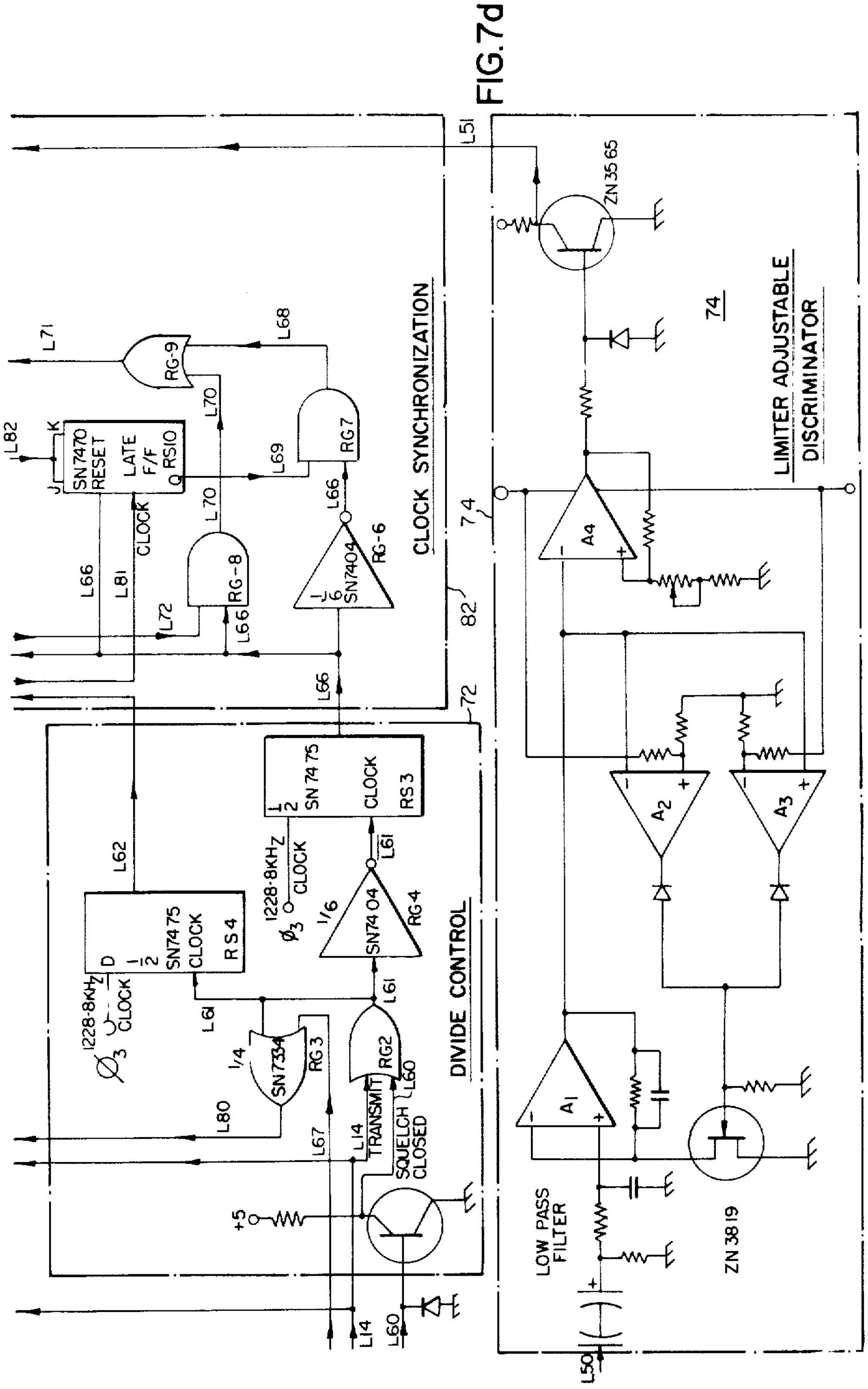
Figure 15:
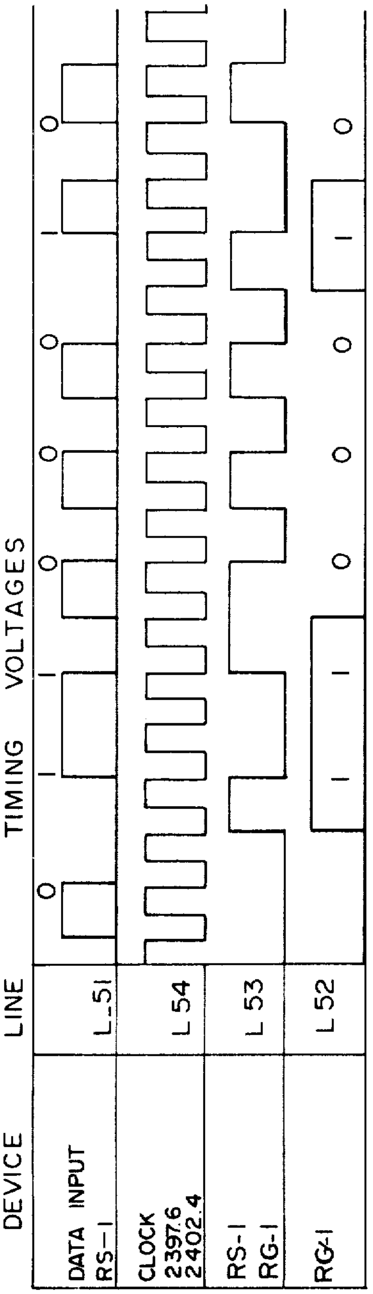
FIG. 15 is a timing diagram for the bi-phase decoder unit.

The receiver signal input is on line L-50 and passes through a low pass filter and the limiter-adjustable discriminator unit 74 to produce logic levels of voltage on line L-51 (FIGS. 7*d* and 7*c*). The adjustable limiter discriminator unit 74 (FIG. 7*d*) is conveniently described in the publication "Electronics" Feb. 21, 1974 at page 98 in an article by D. D. Barber entitled "Adjustable Discriminator Cleans Up Signal Noise". Thus, its operation will be clear and need not be described in detail. The bi-phase decoder unit 80 is illustrated in FIG. 7*c* and the timing diagram for its operation is represented in FIG. 15. The bi-phase decoder unit 80 is, of course, in the receiver section of the system and the bi-phase transition modulation means that a 1 bit is described by a 180° phase shift and a 0 bit by repeating the same wave. Data is entered into the decoder 80 from the limiter discriminator unit 74 (FIG. 7*d*) on line L-51. The decoder 80 comprises two devices; a shift register SN7495 and an exclusive OR gate as illustrated. The clock pulses on line L-54 are at 2397.6 Hz or 2402.4 Hz depending on the transition relationship described below with reference to the clock synchronization operation. The clock pulses are used to operate the device RS-1 and two bits of the shift register are used to produce a 360° phase shift and an output on line L-53. Lines L-53 and L-51 comprise the input into the exclusive OR gate RG 1 and this produces the non-return to zero logic levels on Line L-52.

It will be understood that the letter code is:

G = Gate;

TG = Transmit Gate;

L = Line;

S = Switch etc.;

T = Transmit side;

R = Receive Side

SYNCHRONIZATION is produced, of course, by utilization of the frequency pulses produced by the crystal clock unit. This is accomplished by the divider control unit 72 (FIGS. 4 and 7*d*), the clock synchronization unit 82 and the divider unit 84. The basic reference is established by 1228.8 KHz clock pulses and the clock synchronization will be described with reference to FIGS. 7*c* and 7*d* as well as with reference to the timing diagram of FIG. 16.

In the case of loss of received signal, the squelch L-60 is enabled and in the case of data being transmitted, the transmit data line L-14 is enabled. These enabling actions control the divider control unit 72 so as to pass the 1228.8 KHz signal pulses through to the divide by 1024 unit 84. This produces a 1200 Hz clock reference train of pulses and prevents the reception of data.

In the case of reception of signals, clock synchronization with the received data signals must be established by the system. Synchronization is established from the signal transmission and the objective is to have the positive going pulses of the clock pulse waveform coincide with the centers of the received bit intervals.

To form the error signal for controlling the timing phase, the transitions need not be weighted proportionally to their deviations from the timing wave. In fact, it was found sufficient and perhaps desirable to classify the transition as early or late and to control the timing phase so as to have equal numbers of each.

A convenient digital method of phase control was used in which a timing wave is obtained by frequency dividing the output of the crystal oscillator running at 1024 times the bit rate. If the timing wave is found to be leading in-phase at a transition, one of the count pulses from the oscillator is deleted. This retards the phase by 1/1024 of a bit interval and produces a timing frequency of 1201.2 Hz. On the other hand, when the timing wave is lagging in phase, an extra count pulse is fed to the count down circuit thus advancing the phase by 1/1024 at a bit interval and producing a timing frequency of 1198.8 Hz. As indicated above, in the absence of a data signal, as indicated by an enabled squelch line, the clock reverts to 1200Hz. Once a phase has been established by the above method, the time interval for a de-phasing of $\pi/2$ or 90° is as follows:

$$\Delta\omega t = \frac{\pi}{2}$$
$$\Delta\omega = 2\,\pi\Delta f$$
$$t = \tfrac{1}{4}\Delta f = \tfrac{1}{4}.\,(1201.2 - 1198.9)$$
$$= 200\ ms.$$

Since the average message is less than 100 ms., this should be more than sufficient time for error free messages.

Figure 16:
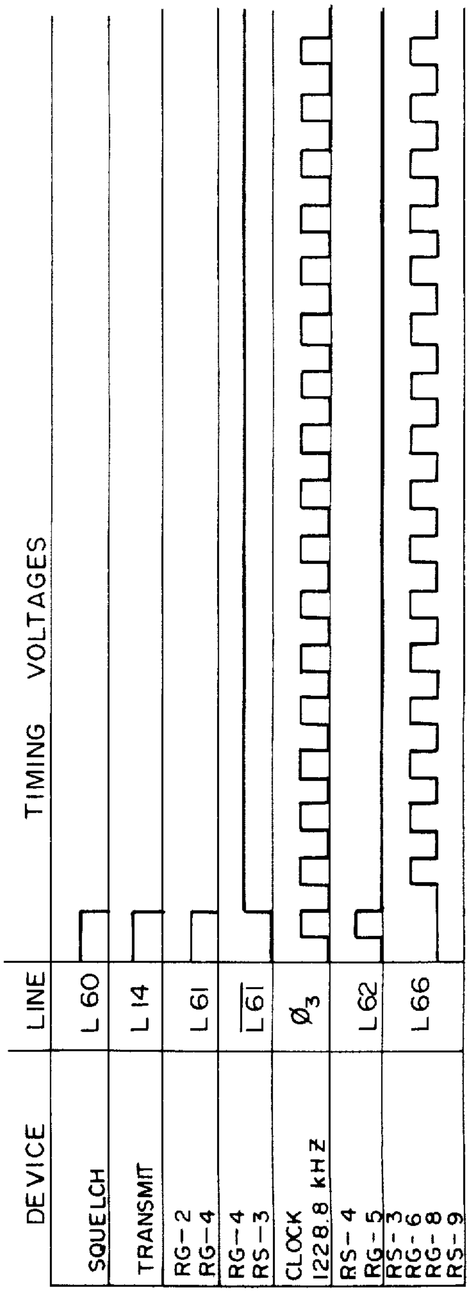
FIG. 16 is a timing diagram for use in describing the clock synchronization operation of the system.

In FIG. 16, there is illustrated the timing diagram for the clock synchronization of the system shown in FIG. 7 (i.e., transmit enabling operation and squelch disabling operation). The timing chart shows the transfer of the clock pulses from the transmit or squelch transmission to the receive condition. A squelch voltage on line L-60 (FIGS. 7*b* and 7*d*) gives and indication that there is insufficient signal to decode a message. The enabling of the transmit line L-14 indicates that the transmitter is on. When line L-60 and L-14 are low, line L-61 gives low voltage and line L-61 gives a high voltage. This disables the device RS4 and enables the device RS3. The clock pulses at 1228.8 KHz are thereby transferred from line L-62 to line L-66. When either line L-60 or L-14 is high, the clock pulses pass through the devices to line L-62 only.

Figure 19:
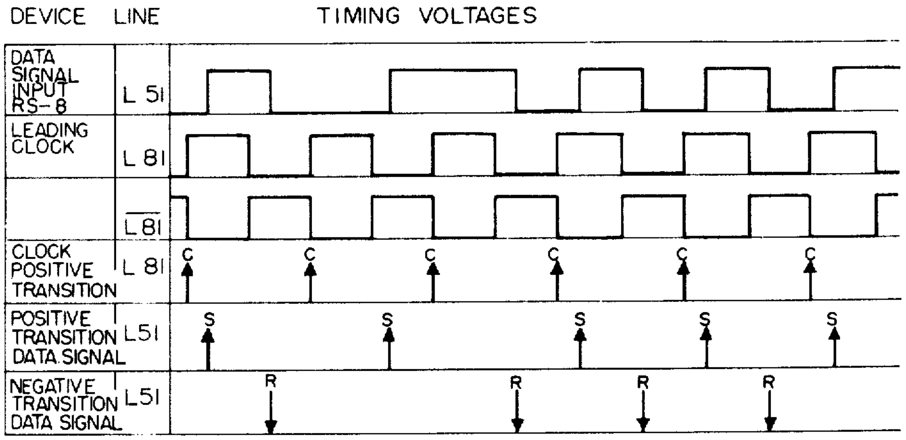
FIG. 19 is a timing diagram for the transition detection operation for the case of leading clock pulses.
Figure 20:
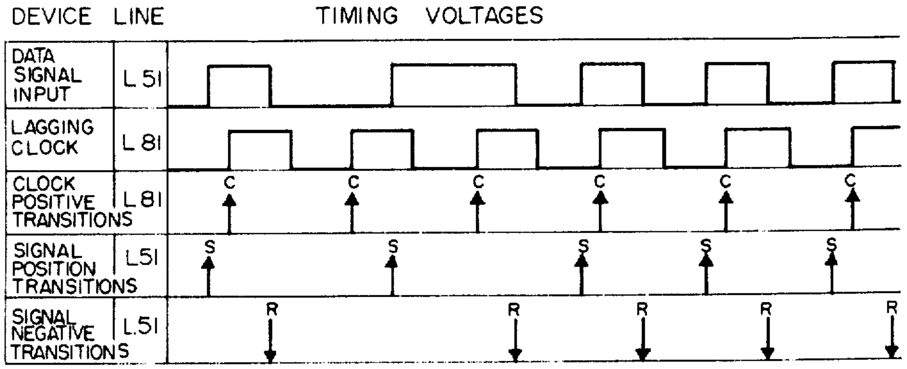
FIG. 20 is a timing diagram for the transition detection operation for the case of lagging clock pulses.

The operation of the transition detector unit 78 (FIGS. 4 and 7*c*), will now be considered with reference to the timing diagram of FIG. 19 (for leading clock pulses on transition detection) and FIG. 20 (for lagging clock pulses on transition detection).

We define the clock on line L81 positive transition by C, the data signal on line L51 positive transition by S and the data signal on line L51, negative transition by R. By inspection of FIGS. 19 and 20, we are able to identify a set of logical conditions which must hold for the conditions of the clock leading or lagging the data signal, Leading Clock = C · S· R Lagging Clock = C · R · S A logical ambiquity may arise during a differential phase shift keying such that two C or clock pulses may occur during a pattern.

CLOCK LAGGING = C· R· C· S

This ambiguity may be eliminated by ignoring the second clock pulse and reducing the pattern to:

Leading = C· S· R

Lagging = C· R· S

The purpose of the transition detection circuitry is to examine the data signals with respect to the clock pulse signals. If the clock is leading the data signal transitions, then line L82 is set high and if the clock is lagging the data signal then line L82 is set low. The transition detection circuitry is described in the next section. It is based on the use of type SN7470 edge triggered flip-flops which have the following truth table:

| In | | In + 1 |
|---|---|---|
| J | K | Q |
| 0 | 0 | $Q_n$ |
| 0 | 1 | 0 |
| 1 | 0 | 1 |
| 1 | 1 | $\overline{Q_n}$ |

a. Clock pulses enter device RS-8 (FIG. 7*c*) on line L81. The first positive edge sets Q or L90 to 1 and $\overline{Q}$ ($\overline{\text{L90}}$) to 0. ($\overline{\text{L90}}$) at 0 sets J and K to 0 and prevents a second clock pulse from changing the state of (RS-8).

b. (L90) at 1 enables the gate on line (RG-19) so that data signals on line (L51) may enter the transition detector circuit by passing through device (RG-19) to line L91.

c. Line L-90 at 1 sets J to 1 and $\overline{K}$ to 0 so that the first positive edge on line L-91 will set RS-14 to 1

Transition of the clock on Line L-81; Q or L-69 goes to 1 d. TG-20 inverts L-91 so that negative transitions become positive transition for RS-15. L-90 enables RS-15 so that negative transitions on L-91 will set RS-15 to 1 on L-93.

e. Leading Clock =C.S.R.

For a leading clock the first transitions on L-91 will be positive or (S). This will set L-92 high to 1, J to 1 and $\overline{K}$ to 1 on RS-16. The second transition will be negative or (R), this will set L-93 to (1), L-93 will clock RS-16 which will go to 1 if it is not already in that state or will remain at 1 if already there.

Since L-92 and L-93 are now both at (1), gate RG-21 is enabled to set L-94 to 1. L-91 controls the presents or RS-8, RS-14 and RS-15 which now have Q set to 0. Since $\overline{Q}$ on RS-8 is now 1, J and K are not 1 and RS-8 is enabled to accept a new clock input on L-81.

f. Lagging Clock = C.R.S.

For a lagging clock the first transition on L-91 will be negative or R. This will set L-93 to 1. Since L-92 is preset to 0 at the beginning of each step. J is 0. and $\overline{K}$ is 0 on RS-16, then L-91 will clock. RS-16 to 0 on L-82 if it is not already in that state or will remain at 0 if already there.

The second transition will be positive or S, this will set L-92 to 1. Gate (RG-21) is enagled by L-92 and L-93 so that L-94 is 1 which presets RS-8, RS-14, and RS-15, to 0 to begin acceptance of next cycle.

We will now consider the operation of the synchronization as determined by units 82 and 86 in FIG. 4 and in FIGS. *7a*, *7c* and *7d*.

CLOCK SYNCHRONIZATION UNIT 82 a. The purpose of of the synchronization circuitry is to adjust the positive transitions of the clock timing pulse on L-81 to coincide with the centre of the decoded data signal logic on line L-52. In this manner, it should be possible to decode individual data bits. The advantage of coincidence with the center of the logic wave was illustrated above where it is shown once synchronization is established, a dephasing of the signal will take at least 200ms. Since we anticipate data messages to be on the order of 100 ms this should provide a sufficient cushion.

b. Line L-82 indicates 1 when the clock transitions are leading the data signal transitions and 0 when the clock transitions are lagging the data signal.

c. For a leading clock; one of the count pulses from the oscillator is deleted, thus retarding the phase by 1/1024 for a bit interval. This is accomplished as follows: Line L-82 is at 1 so that J and K on receive switch device RS-9 are also 1. On the first positive transition of the clock on Line L-81 and prevents one 1228.8 kHz pulses on L-66 from passing to L-70. The next pulse on line L-66 presets RS-9 to 0 such that $\overline{Q}$(L-72) goes to 1 which allows pulses on L-66 to pass through RG-8 to L-70.

d. For a lagging clock; an extra count pulse - is fed to the count down circuit, thus advancing the phase by 1/1024 of a bit interval. This extra count pulse is obtained from the oscillator by taking a 180° phase shift and adding the result. This is accomplished as follows:

Line L-82 is at 0 so that Line $\overline{\text{L-82}}$ is at 1 and J and K on RS-10 are also 1. On the first positive transition of the clock on L-81, Q or L-69 goes to 1. L-69 enables gate RG-7 so that an extra pulse passes (i.e., the output of 180° inverter RG-6 or $\overline{\text{L-66}}$ through the L-68. The next pulse on L-66 presets RS-10 to 0 such that L-69 is 0 and gate RG-7 is disabled. 1228.8 kHz pulse continue to pulse through RG-8 to L-70. Gate RG-9 allows the results of L-70 and L-68 to be added to form L-71.

e. 1024 - Divider unit 84

Line L-71 from the reception synchronization and Line L-62 form the transmit clock are "or"ed in gate RG-5 to produce L-63. L-63 enters the 1024 divider 84 comprising RS-5, RS-6 and RS-7. The result is a signal of a. 1200 Hz for transmit b. 1198.8 Hz or 1201.2 Hz for receive synchronization As indicated above, the 1198.8 Hz signal is obtained by deleting a count pulse, thus requiring an extra interval to achieve the division of 1024. The 1201.2 Hz signal is obtained by adding a count pulse, thus reducing the interval to achieve the division by 1024.

Figure 21:
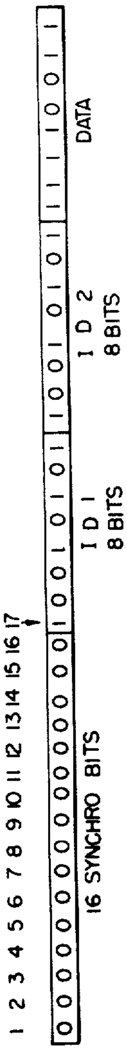
FIG. 21 is an example of the data message.

Start of Message Synchronization Unit 86 a. DATA MESSAGE A typical data message used for vehicle communication is described in FIG. 21.

Figure 22:
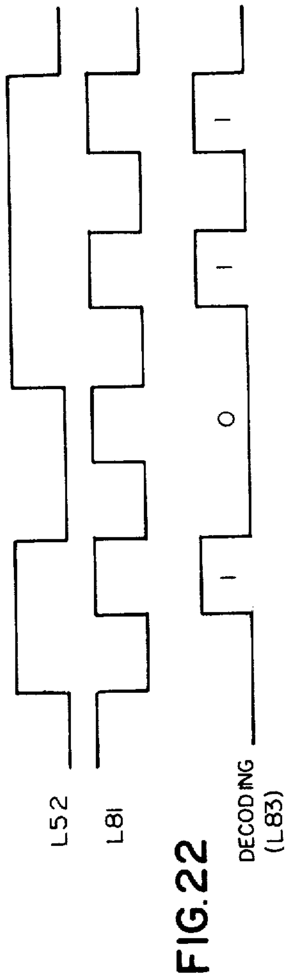
FIGS. 22 and 23 are representative timing diagrams for the clock synchronization operation.
Figure 23:
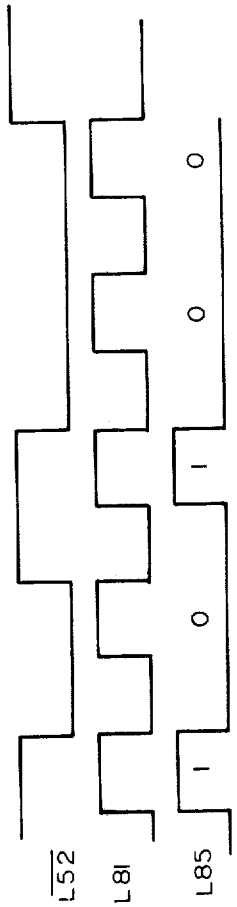

Each data message received by the microprocessor 52 begins with 16 zero bits. This enables us to identify the beginning of each message very easily by looking for 16 consecutive zero bits and realizing that the actual message begins on the seventeenth bit. The circuitry described here is designed to search for the beginning of the message and begin reception of the data message once synchronization has been established.

b. Transmit Control line L-14 (FIG. *7b*) and Squelch Closed line L-60 pass through gate RG-2 (FIG. *7d*) to produce a signal on line L-61 which disables the reception clock and reverts the system to a 1200 Hz transmit clock whenever the transmit control indicates 1, i.e. to send a message or whenever the receiver completely loses contact with the base station and the squelch closes. Due to the dynamics of the receiver squelch system, it is unlikely that losses of signal of less than 100 ms duration would be sufficient to close the squelch. A 1 condition line L-61 is sufficient to begin the start of message resynchronization procedure.

c. Resynchronize Control line L-67 (FIGS. *7b* and *7d*) and line L-61 are gated by gate device RG-3 to produce a signal on line L-80 (FIGS. *7c* and *7d*). Thus, any of three conditions i.e. transmit, squelch close or resynchronize will set line L-80 to 1 and require the initiation of the start of message resynchronization procedure. On receive line L-80, is normally 0.

d. Line L-80 passes through inverter device RG-11 to become ($\overline{\text{L80}}$). Under normal receive conditions (L-80) is 0 and ($\overline{\text{L80}}$) is 1.

e. The receive clock signal at 1198.8 Hz or 1201.2 Hz on L-43 is gated by ($\overline{\text{L-80}}$) through gate RG-12 to pass the receive clock to L-81.

f. (L-52) carries the biphased decoded logic levels from the biphase decoding circuitry. (L-52) is inverted by RG-14 to produce ($\overline{\text{L-52}}$).

g. The clock pulse L-81 has been synchronized by the clock synchronization circuitry such that the positive transition shall coincide with the center of the decoded logic level on line L-52 - see FIG. *7c* and timing diagram FIG. 22.

h. ($\overline{\text{L-52}}$) and L-81 are gated by the AND gate RG-16 to produce a signal on line L-85. Line L-85 indicates 1 when the signal on L-52 is 0. L-85 enters as a clocking pulse to the divide by 16 counter RS-11 - see FIG. *7c* and timing diagram FIG. 23.

i. Line L-52 and Line L-81 are gated by gate device RG-13 to produce a signal on line L-83 as shown in FIG. 22. Lines L-83 and L-80 are OR Gated by device RG-15 to produce a signal on line L-84. L-84 acts as a reset line for RS-11 the divide by 16 counter.

j. Line L-85 produces clock pulses for the divide by 16 counter RS-11 whenever a logic 0 from the biphase decoder RS-1 coincides with the clock pulse on line L-81. Therefore, RS-11 will count for 16 0 bits to indicate the synchronization with the start of the message. If a 1 bit appears in the sequence then RS-11 has its count reset to 0 by L-84 going to 1. Furthermore, a 1 condition to squelch closing, transmit, or resequencing request will set L-80 to 1 thus enabling L-84 and resetting RS-11 to 0.

Thus, RS-11 serves the function of counting 0 bits to search for 16 consecutive 0 bits which indicates the beginning of the message by setting L-86 to 1.

k. L-86 through gate RG-17 enables latch RS-12 to pass the value of D or $\overline{\text{L-80}}$. Under receive conditions L-80 is 0 and ($\overline{\text{L-80}}$) is 1. Once L-86 enables RG-17 under normal receive conditions, so that L-87 becomes 1. L-87 will pass through RG-17 to hold RG-12 open to pass $\overline{\text{L80}}$ to L-87, even though L-86 will cease to be 1. When a transmit request, squelch closing or resynchronize request sets L-80 to 1 and ($\overline{\text{L-80}}$) to 0. L-87 goes to 0 and RG-12 is disabled.

L. L-87 is AND gated with the receive clock line L-81 through gate RG-23, to produce a synchronized clock line L-88. L-88 is used as the clock to decode the logic levels on L-52 to the serial to parallel converter RS-17. RS-17 is a 8-bit device, so data must be transferred when 8 bits have been received. The microprocessing unit 52 (MPU) is informed that 8 bits are in RS-17 by L-88 clocking into a divide by 8 counter RS-13 which sets L-89 to 1. The data transfer rate of the MPU 52 is approximately 2-5 μs, while one bit at 1200 Hz takes 833 μs to form. This should provide efficient time to process the transfer of data from RS-17 to the MPU memory before a new bit is received by RS-17.

This finishes the description of the differential biphase shift keying modulator demodulator unit which would be used in transfer messages to and from the MPU 52.

It will be appreciated that an advantage of the described embodiment is that it should be possible to attach it to the audio input and output of any regulation transreceiver.

It will be appreciated from the above detailed description that the embodiment permits the remote change of a program. It is possible to change the operation of the logic devices whilst they are mobile.

As mentioned above, a basic unit is the microprocessor unit 52 (FIG. 7*a*). The system using this unit according to the present embodiment, appears capable of reading data (logical voltage levels), storing data in memories, reading instructions from the memories and writing the data.

SELF-CHECKING FEEDBACK

The system according to the described embodiment includes a self-checking feedback method. Thus, the TRUMP is capable of checking the operation of its peripheral units and reporting back as to the malfunctioning of any unit. This is achieved by including a data feedback input which is used with peripheral output lines. On the multiplexing data interface, all the peripheral output lines are latched at the last output logical level. For reasons of noise immunity, the latch output feeds into an optical isolator unit which in turn drives the peripheral device. To illustrate this point, an example will now be considered with reference to FIG. 17 and also with reference to the timing chart of the self-checking feedback operation as shown in FIG. 18.

Figure 17:
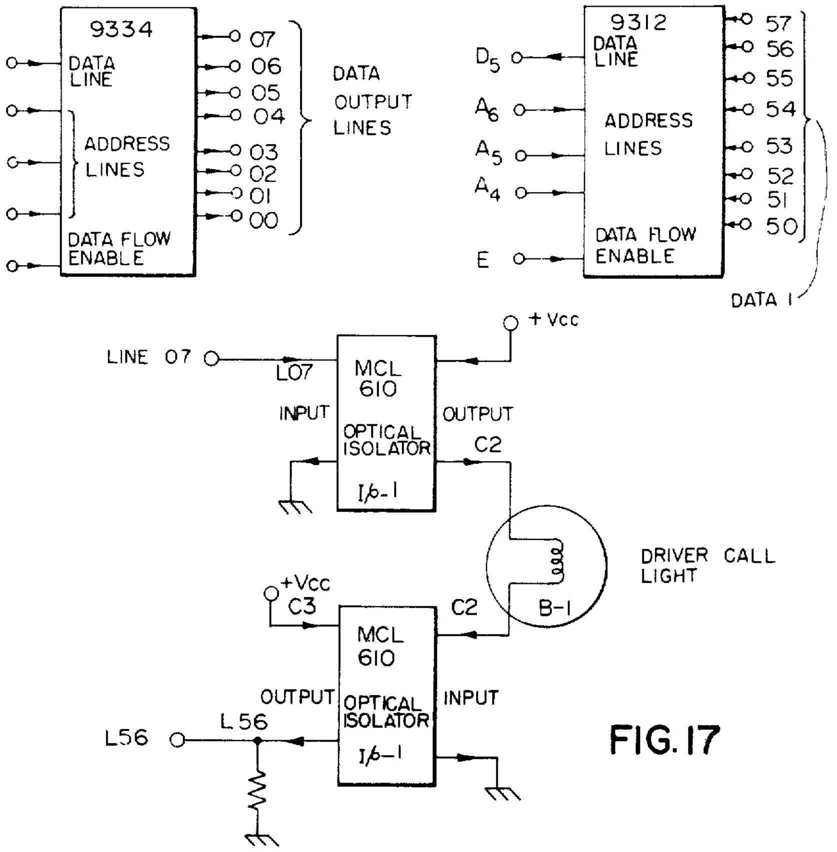
FIG. 17 is a diagrammatic representation of an example of the operation of the self-checking feedback circuit.
Figure 18:
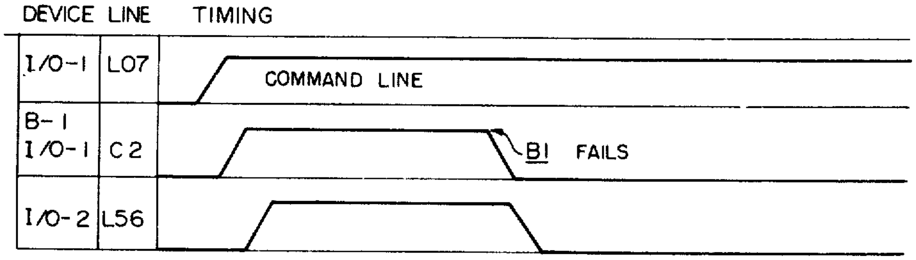
FIG. 18 is a timing diagram for the self-checking feedback circuit.

In this example, a message was received and decoded by the MPU to turn on the Drive Call Light B1 (FIG.17). Since light B1 is controlled by low speed output line L07, then L07 is set High. When a threshhold (20ma) current has been received after a suitable period of time (20ms), the optical isolator I/0-1 begins to conduct and line C2 is set high. Conduction on line C2 turns bulb B-1 on.

Line C2 also inputs in series to optical isolator I/0-2, so that conduction in line C2 also turns on low speed input line L56. In this manner the MPU is fed back the information that the peripheral device — i.e. bulb B1 — is functioning properly.

If bulb B1 were to fail, line C2 would cease to carry current, (I/0-2) would cease to conduct and line L56 would go low to inform the MPU of a peripheral failure.

If the bulb were to conduct after line L07 were set low, line L56 would remain high to inform the MPU of the failure.

In both cases, the TRUMP unit would be able to self check any of its peripherals for possible failure that could be disastrous.

REMOTE PROGRAM CHANGE CAPABILITY

1. We believe that a feature of the embodiment is the ability to change the operation of logic devices whilst they are mobile. Since the TRUMP unit is a computer that operates from stored programs, all that is required to remotely change the operation of a device is to change the program. This can be accomplished whilst mobile - 2. For example:

| | | |
|---|---|---|
| 1. | IF AB GO TO 4 | |
| 2. | IF BA GO TO 10 | |
| 3. | GO TO 20 | Passenger Counter Algorithm- |
| 4. | OFF = OFF +1 | To count passengers both entering and leaving vehicle |
| 5. | GO TO 20 | |
| 10. | ON = ON +1 | |
| 20. | CONTINUE | |

CHANGE

Via the radio and high speed MODEM the Unit recieves the instruction code to delete line 2, 4, 5, and replace line 1 by 7 IF A or B GO TO 4.

| | New Program | |
|---|---|---|
| 1. | IF A or B Go to 10 | Passenger Counter Algorithm- To count passenger movement for a vehicle only |
| 3. | GO TO 20 | |
| 10. | ON = ON +1 | |
| 20. | CONTINUE | |

The device now will act as a non-directional counter to count movement without direction. The important fact is that we changed the operation of the device whilst it was installed in the mobile vehicle without actually changing the device physically. This facilitates remote control and change in the operation of any of the logical operations of the peripherals attached to the TRUMP unit.

A general description will now be included so as to facilitate a greater understanding of the operation of the described embodiment of the invention. For convenience, the majority of the input lines will be referred to as "dumb"lines and these are lines which indicate merely a simple switch closure, either electrical or mechanical.

Logically these are represented as a single bit of information. One input, however, would be a serial type of input, i.e. a "smart" line. This would be a high speed line for transmission of data over the radio.

DESCRIPTION OF DUMB LINE INPUTS

1. Odometer head pulse. Rate would be variable but this rate would not exceed 10 every second, i.e. one pulse every 100,000 micro seconds. 2. Passenger Counters. We will expect a maximum pulse rate here of about two pulses per second. Each passenger counter device would probably require two dumb lines so that one could logically derive the direction of travel of the passenger. For example, if we had two lines, line 1 followed by line 2 would indicate a passenger going in direction 1, 2 whereas a closure on line 2 followed by line 1 would indicate a person going in direction 2, 1. Each door of the vehicle would probably require a passenger counter i.e., on a standard bus there would be one at the front door and two for the back doors. The reason we mentioned the speed of the maximum pulse rate is that we would expect TRUMP to look for changes of status of lines rather than counting pulses. In this way, we would always have D.C. type of inputs in our system and probably avoid a lot of noise problems. If the time of the pulses is in the order of the odometer pulse of 100,000 micro seconds, this is considerably slower than one typical machine's cycle time which for an Intel 8080 chip is about 2 micro seconds. This will mean that we will have a great deal of time between input status changes.

3. A dumb line indicating a frequency lockup by the transmitter and another dumb line indicating a frequency lockup by receiver or else the frequency synthesizer inside the transmitter/receiver would not be receiving the right signal or transmitting the right signal.

4. A strap to ground on a certain number of inputs — may be 13 inputs for the bus technical number. This number would be unique to the bus. One way of doing this would be to have a plug built right into the specific bus so that when you pull the micro processor unit out, the plug would remain behind which would be prewired indicating that vehicle. In this way, all micro processor units would be absolutely interchangeable.

5. 16 lines would be used — one for each driver input button. The driver input buttons would be simple switches resembling the standard touch-tone telephone pad. The buttons themselves would mean numbers from 0 to 9 and if we had 16 buttons, we can have one for error reset, one for emergency, one for request to talk, and one to indicate ready to go.

6. Simple switch closures to indicate that doors were open. This could be a simple micro switch which would be hooked onto the door.

7. A microphone push to talk device which would indicate that the microphone or the transmitter was being used to transmit voice rather than data.

A possible way of utilitizing the micro processor is to have TRUMP scan its dumb input lines to see if anything is happening. If we were to implement TRUMP with an Intel 8080 chip then it might be beneficial to consider an eight bit computer work as the standard data transfer unit. The Intel 8080 using an eight bit word is probably trying to scan eight dumb lines in parallel. Therefore, we would have to have a fairly intelligent grouping of which terminals we connect to the TRUMP unit to thave the most efficient utilization of its scanning. For example, you might want the first part of the passenger count to be a one scan word, the second part of the passenger count to be a second scan word. In this visulization, of the TRUMP with our 64 input lines and 64 output lines, we in fact have eight words of input that would be taken in at what we call the low speed input. Except for the odometer count and the passenger count no input has to have a scan of faster than one per second which means that probably one word — the odometer head — would be scanned very quickly and the other words would probably be scanned at a much slower rate. Inside the program, what we would, of course, be doing is looking for changes in the status of our line.

SCANNING PROGRAM

Scanning could be done using a computer software in the following manner.

1. Read the content of the selected input point into the accumulator. 2. Compare the contents of the random access memory register containing the last scan with the accumulator. If there is a change in value this will set a flag.

3. If flag is set branch to selected memory address.

4. Compare the exclusive OR of the content of the register with the accumulator. This will identify the bits that have changes, specific bit, and in this case the specific dumb lines that have changes. Those that are different are result in ones being in both bits, e.g., if the third bit has changed the resulting number is 00000100.

5. In the memory we have stored eight single bit comparison words. These start at 1000000000, at the first one, the second one is 01000000, and the next number is 00100000 and so on. As you can see, there is only bit in each of the positions in each word. What we do in the next step is we AND the content of the memory with the acculator which now contains the exclusive word results. If any bit in the exclusive OR accumulator is a 1 an overflow flag is set.

6. We can call a separate program at a particular memory message if this carry flag is true. In this way we can go through and identify each of the eight lines in a scan to see if any of them have changed.

7. If any of them did change, by branching and subroutines, we can go to the appropriate action. For example, if a third bit had changed and this was an odometer count, a branching subroutine would cause an increment in odometer counter accumulator memory register by one. In fact, this is a program for scanning the odometer counter.

As you can see by adjusting the number of reads we make, you can change the scan rate of the particular line by judicious use of subroutines. By taking advantage of the speed of the central processor of TRUMP, we should more than be able to achieve many times the capacity to read data we might require. The real power in this device is the fact that we can actually take advantage of our eight bit words in that we read eight lines in parallel simultaneously. We have eight times the speed that you might expect from a device. An actual read cycle of 1 bit would probably only take something like two micro seconds and it is estimated that the logical comparison of the read would probably take less than 100 micro seconds. This is, of course, parallel processing of many actions.

OUTPUT FROM TRUMP

We have allowed for 64, what we called dumb output lines, from TRUMP. Now these will be transmitted out through a latching device which will hold its previous status until changes. These are relatively low speed lines, for example, you may turn the sound system on or turn on driver display lights or passenger display lights. Of course, the outputs which we would expect would be the following:

1. Driver display light, probably about 10, maybe 16 depending on the configuration of the pad.

2. A sound system control, a control for the audio for the driver or the passengers.

3. Driver display lights, maybe the driver of the display panel may be given a display, such as to speed up or slow down — something like a 30 digit or 32 digit standard plasma display. This kind of display is relatively complete and requires a lot more information be transmitted.

4. A frequency switch; this probably consists of maybe 8 lines which will have a status setup on them and the value of these lines this would, of course, affect the presets into standard frequency synthesizers which being of a binary nature would change the divide ratio in the frequency synthesizer from the crystal standard and allow frequencies to be changed.

A typical program might be that once TRUMP has been given a command to turn on one particular status line the program would have all kinds of calculations and so on to go through. For example, it was given a new frequency change. The frequency change would consist of an eight byte work indicating a new frequency. Upon receipt of this work it would say to itself — pull out and write this new frequency into the memory. The next operation would be load the accummulator from the memory position. The next instructions would be — write the content of the accumulator onto the output port selected. In this case the output port would be the frequency switches. This would send the new binary pattern down to the frequency switch output port which would set up the value in the latch. This change of the latches would change the values on the frequency divider and thereby change the new frequency.

HIGH SPEED INPUTS AND OUTPUTS

High speed input is, of course, normally the data message coming in from central control. In a 1200 baud one can expect a message every 830 micro seconds during central control transmissions. This is not particularly fast with respect to the two micro second cycle times but might tie up the system. We propose, for example, using a 100 $\mu s$ shift register to store the transmitted data from control. We could do this as follows: if we used, say 16 bits, i.e., two complete words as zero for synchronization, then a counter is used and when it counts 16 zero bits in a row, in other words a synchronization pulse, the 17th bit is loaded directly into the register, and from then on up until the end of the message. In the case of a 100 message after the first 16 you have only 84 to go into the 100 byte register, so you have got to do some counting and herein is where you can make use of some of the dumb input lines. If we set up 8 bits for one input word as the counter taking the output from a counter associated with the 100 bit register and we keep track of the count when the count is equal to say 84 we institute a stop transfer of data into the memory or into the register. The next operation, of course, would be to compare ID's on things, identifications then do the error correction. The ID Comparison could be error correction done by double framing to make sure it is correct. In this way, we actually used the micro processor as part of of the module as well as to actually control the rest of the system. We should have plenty of time because to transfer a 100 bit message each coming in at 830 micro seconds per bit takes 8,300 micro seconds incoming messages — more than ample time.

The high speed output to the radio transmitter could be achieved as follows. The system described would compare the output message transferring it 8 bits at a time, go through a parallel to serial converter and load up a 100 bit register. When the full message has been loaded into the register the system would enable a transmit clock to transfer the message out at 1,200 baud from the register into the transmitter. This transfer, of course, could be done completely independently while the system continued on doing its other tasks. Another advantage of the described system is that it is doing the counting for its message. This allows one to have a variable length message and the system can be programmed to count any number of bits into its message so we could have either variable length in or variable length out. Of course, the message transfers are done from 100 byte registers and a pair of these are contained in a single Intel 1507 chip. This means that the rest of the computer is free to go ahead and do other tasks. Of course, we would have feedback on the output so that you could also run a counter on that so that when the last byte was set up it would turn on another input line to the system, so that the system would know that its registers were clean and it was ready to go again. Part of the cleaning, of course, would have to be loading all the register with zero which would probably do just from a clock counter. So, it will be apparent that there is a great deal of advantage to be had from the input and output lines being controllable.

From the above description, it will be seen that the micro processor is provided on a bus for monitoring and control purposes. Thus, remote program change is possible and a feed back (self-check) feature is incorporated. In view of the system used, universal and versatile facilities of the input-output operation is achieved by simple switch closures. It would appear that there is a substantial economic advantage in the described system having regard to the prior art systems. The use of the modem unit as described, takes full advantage of the speed thereof. Further points which should be kept in mind in connection with the described embodiment are identified as follows, it being appreciated that the abbreviation TRUMP is in respect of a "transit universal micro processor".

By means of the described system there is provided is a method for handing information to a mobile vehicle.

The described system incorporates many devices optionally including a micro processor for executing logical instruction, a data store for storing data collected, an input/output interface for connecting peripherals, a MODEM, and a real time clock, a program store for storing logical instructions.

The described embodiment uses a radio link between base station and the mobile vehicle as the communications link and uses simple switch closures for on the vehicle data collection and display. The embodiment replaces individual "bits and pieces" of hardware logic devices that have traditionally been used for mobile vehicle data collection and display.

THE ADVANTAGES OF THE DESCRIBED EMBODIMENT

1. The described system is a mobile communication method which can use a large range of peripherals which need only consist of simple switch closures.

2. The system allows any mobile radio to be connected to any peripheral device without the requirement of special interfacing.

3. The system allows for the logical function of any peripheral device to be changed without changing the device physically.

4. The system allows for the mode of communications to be changed, e.g., the data message between base and mobile may be changed without requiring the rewiring of any part of the system.

5. The system allows for simple maintenance since:

a. It can be self testing b. The simple nature of the peripherals allows for simple maintenance.

6. The described system should cost less than a similar collection of discrete hard wired logical peripheral devices.

7. The system allows for peripheral devices to be added or removed from the system in a simple way.

8. The specific functions of the described system and the peripheral may be remotely changed by commands from the base station.

It will be seen that data handling and logic functions are defined into a single unit. This approach has a number of potential advantages to transit industry in the terms of cost and flexibility. It would be compatable with any radio and therefor allow standard radio equipment to be easily specified, acquired and maintained. Data collections such as passenger counters and displays such as teleprinters could be accomplished by simple switch closures at significantly lower cost than present equipment being used in transit industry. It would be adaptable to any size transit system or control activity if specific functions can be added or removed easily and inexpensively. The components can be uniquely specified and would be available from more than one manufacturer.

In the above description, particular reference has been made to the controlling of buses. It will be appreciated that the present invention is not restricted thereto but can conveniently be used in controlling and identifying other moving objects. For example, it will be readily apparent that the system may be used in connection with other vehicle systems, e.g., a city taxi cab operation.

It will furthermore be appreciated that the logical units within the transit universal microprocessor unit may be utilized and rearranged to perform particular functional operations as required under control of particular sub-program instructions. For example, part thereof may be arranged to function as the modulator-demodulator unit when required whilst at other times the specific logical units may be arranged to perform an entirely different function. The remote program change capability permits remote change of the logical operation of the device, not only in the field but while the vehicle is in motion. It also provides ultimate flexibility for controlling the logical operation of the system at any time. Thus, the number of operations which can be assigned to any peripheral device is substantially unlimited except, of course, by the magnitude of the available memory units in the described system. This is a substantial improvement over hard wire systems in which a change in logical operation would necessitate re-wiring the hard wire system.

It will be readily apparent to a person skilled in the art that a number of variations and modifications can be made without departing from the true spirit of the invention which will now be pointed out in the appended claims.

What is claimed is:

1. A closed loop vehicle monitoring and control system including a central control station and one or more vehicles to be monitored during movement along a path of travel, a transit universal micro processor unit and one or more peripheral devices mounted on each vehicle, each peripheral device being interchangeably connected with the microprocessor unit for the flow of information therebetween, a two-way radio communication data information link between each vehicle and the central control station whereby information as to the vehicle can be received at said central control station from said vehicle, said control station analysing said information and preparing correspondingly modified instructions for said vehicle, said control station then transmitting said modified instructions to said vehicle.

2. A system according to claim 1 wherein the input of data information to and output of command information from said transit universal micro processor unit is by way of simple switch closure devices.

3. A system according to claim 1 wherein said transit universal micro processor unit includes a plurality of stored sub-programs, each sub-program being capable of controlling the operation of one or more peripheral devices whereby a change in the operation of a respective peripheral device can be achieved by changing the respective sub-program.

4. A system according to claim 3 wherein said change in the respective sub-program can be achieved whilst said vehicle is in motion along its said path of travel.

5. A system according to claim 3 wherein said transit universal micro processor unit facilitates simple interfacing with a voice radio system.

6. A system according to claim 1 including self checking means comprising means connected to each peripheral device whereby on operation of each respective device in response to a signal from the transit universal micro processor unit then an indication of such operation is provided to an input of the transit universal micro processor unit, the absence of said indication alerting the transit universal micro processor unit to a possible malfunctioning of the respective device.

7. A system according to claim 1 wherein said transit universal micro processor unit includes a plurality of means comprising modulator-demodulator means for high speed transmission capability, encoding and decoding means, central microprocessing means, memory means comprising random access memory capability as well as read only memory and programmable read only memory, latch means for storing output signals, multiplexor means to fan out output signals to several peripheral devices, concentrator means for concentrating input signals into a relatively small number of input lines, and a plurality of optical isolator means to isolate said plurality of means said plurality of means being interconnected through logic data lines of said processor unit.

8. A system according to claim 7 including self checking means comprising a particular optical isolator connected to each peripheral device whereby, on operation of the respective device, in response to a signal from the transit universal micro processor unit, a signal input is provided to the respective particular optical isolator, the output of the respective particular optical isolator being connected to an input of the transit universal micro processor unit whereby the transit universal micro processor unit receives an indication of the operation of the respective device, the absence of said indication alerting the transit universal micro processor unit to a possible malfunctioning of the respective device.

9. A system according to claim 1 wherein a plurality of peripheral devices are provided comprising odometer means, passenger counter means, driver display means, passenger loudspeaker means and passenger display means, and wherein said vehicle within the system is provided with a transit universal micro processor unit, whereby selected ones of said peripheral devices can be connected thereto dependent on the requirements of the respective vehicle.

* * * * *